United States Patent
Herrier et al.

(10) Patent No.: US 12,287,282 B2
(45) Date of Patent: Apr. 29, 2025

(54) METHOD FOR RECALIBRATING AN ELECTRONIC NOSE

(71) Applicant: ARYBALLE, Grenoble (FR)

(72) Inventors: Cyril Herrier, Grenoble (FR); David Harbine, Grenoble (FR); Yanis Caritu, Grenoble (FR)

(73) Assignee: ARYBALLE, Grenoble (FR)

( * ) Notice: Subject to any disclaimer, the term of this patent is extended or adjusted under 35 U.S.C. 154(b) by 264 days.

(21) Appl. No.: 17/758,291

(22) PCT Filed: Dec. 28, 2020

(86) PCT No.: PCT/EP2020/087942
§ 371 (c)(1),
(2) Date: Jun. 30, 2022

(87) PCT Pub. No.: WO2021/136761
PCT Pub. Date: Jul. 8, 2021

(65) Prior Publication Data
US 2023/0031220 A1 Feb. 2, 2023

(30) Foreign Application Priority Data

Dec. 30, 2019 (FR) ...................................... 1915729

(51) Int. Cl.
*G01N 21/27* (2006.01)
*G01N 21/552* (2014.01)
*G01N 21/78* (2006.01)

(52) U.S. Cl.
CPC ......... *G01N 21/274* (2013.01); *G01N 21/553* (2013.01); *G01N 21/783* (2013.01); *G01N 2201/1214* (2013.01)

(58) Field of Classification Search
CPC .. G01N 21/274; G01N 21/553; G01N 21/783; G01N 2201/1214
See application file for complete search history.

(56) References Cited

U.S. PATENT DOCUMENTS

2003/0227394 A1* 12/2003 Rothgeb ............. A47L 15/4297
340/870.01
2004/0007213 A1* 1/2004 Oono ................... F02D 41/3863
123/495
(Continued)

FOREIGN PATENT DOCUMENTS

AU 2018226567 A1 10/2019
CN 206540883 U * 10/2017
(Continued)

OTHER PUBLICATIONS

Brenet et al. "Highly-Selective Optoelectronic Nose Based on Surface Plasmon Resonance Imaging for Sensing Volatile Organic Compounds" Anal. Chem. 90, (Published Jul. 19, 2018) 9879-9887.
(Continued)

*Primary Examiner* — Jonathan M Hansen
*Assistant Examiner* — Jarreas Underwood
(74) *Attorney, Agent, or Firm* — TraskBritt

(57) ABSTRACT

A method for recalibrating an electronic nose includes successively injecting, into a measurement chamber, reference gases that do not contain target compounds and that have various values of relative humidity. A measurement signal is determined in the course of each injection. Then, for each reference gas, a baseline is determined, which baseline is representative of the determined measurement signal. The baseline is also associated with the relative humidity of the reference gas present. A second correction function is determined on the basis of the determined baselines and of the predetermined values of relative humidity. The second correction function is then stored in a processing unit instead of a first correction function.

7 Claims, 8 Drawing Sheets

(56) References Cited

U.S. PATENT DOCUMENTS

| | | | | |
|---|---|---|---|---|
| 2004/0108472 A1* | 6/2004 | Maruo | ................ | G01N 21/552 |
| | | | | 250/504 R |
| 2005/0274899 A1* | 12/2005 | Butler | .................... | G01N 21/33 |
| | | | | 250/373 |
| 2007/0082408 A1* | 4/2007 | Jing | .................... | G01N 21/553 |
| | | | | 436/164 |
| 2017/0356899 A1* | 12/2017 | Guder et al. | .......... | G01N 27/12 |
| 2021/0208068 A1* | 7/2021 | Lincoln | ................ | G01N 29/036 |

FOREIGN PATENT DOCUMENTS

| | | | |
|---|---|---|---|
| EP | 3184485 B1 | | 5/2018 |
| JP | 2008032607 A | * | 2/2008 |
| JP | 2013079832 A | * | 5/2013 |
| JP | 2016-090257 A | | 5/2016 |
| JP | 2016-138782 A | | 8/2016 |
| WO | WO-2018158458 A1 | * | 9/2018 ........... G01N 21/274 |
| WO | WO-2019217792 A1 | * | 11/2019 ........... G01N 21/553 |

OTHER PUBLICATIONS

International Search Report for International Application No. PCT/EP2020/087942, mailed Mar. 9, 2021, 7 pages with English Translation.

International Written Opinion for International Application No. PCT/EP2020/087942, mailed Mar. 9, 2021, 9 pages with English Machine Translation.

Shao et al. "Mechanism and Characteristics of Humidity Sensing with Polyvinyl Alcohol-Coated Fiber Surface Plasmon Resonance Sensor" Sensors, 18, 2029 (Published Jun. 25, 2018).

* cited by examiner

METHOD FOR RECALIBRATING AN ELECTRONIC NOSE

CROSS-REFERENCE TO RELATED APPLICATIONS

This application is a national phase entry under 35 U.S.C. § 371 of International Patent Application PCT/EP2020/087942, filed Dec. 28, 2020, designating the United States of America and published as International Patent Publication WO 2021/136761 A1 on Jul. 8, 2021, which claims the benefit under Article 8 of the Patent Cooperation Treaty to French Patent Application Serial No. FR1915729, filed Dec. 30, 2019.

TECHNICAL FIELD

The field of the disclosure is that of electronic noses allowing characterization of compounds of interest in a gas sample introduced into a measurement chamber that exhibits, during the characterizing phase, a variation in relative humidity.

BACKGROUND

The ability to analyze and to characterize compounds of interest—odor molecules or volatile organic compounds, for example—contained in gas samples is of increasing importance in various fields, and notably in the health field, in the food-processing industry and in the perfume industry (fragrances), and with regard to olfactory comfort in confined public or private places (automotive industry, hospitality industry, shared places, etc.), etc. The characterization of compounds of interest present in a gas sample is achieved via a characterizing system called an "electronic nose."

There are various approaches to characterization, which differ from one another notably in whether the compounds of interest or receptors need or do not need to be "labeled" beforehand with a marker. Unlike, for example, detection by fluorescence, which requires such markers to be used, detection by surface plasmon resonance (SPR) is an example of a so-called label-free technique.

The SPR characterization technique may be implemented by an electronic nose using SPR imaging technology, the compounds of interest then being contained in a gas sample and interacting via adsorption/desorption with receptors located at a plurality of distinct sensitive sites. This characterization technique consists in detecting in real time an optical signal (associated with each of the sensitive sites) representative of the variation as a function of time in the local refractive index due to the adsorption/desorption interactions of the compounds of interest with the receptors.

Insofar as the chemical or physical affinity of interaction of the compounds of interest with the receptors is not known a priori, the characterization of the compounds of interest then amounts to determining a (steady-state) equilibrium value of a parameter representative of the adsorption/desorption interactions of the compounds of interest with the receptors, which parameter is here representative of the variation as a function of time in the local refractive index for each of the sensitive sites. An interaction pattern, or a signature, is thus obtained which characterizes the compounds of interest. Specifically, as the adsorption/desorption interactions of the compounds of interest at sensitive sites (functionalized surfaces) exhibit differentiated adsorption characteristics it is possible to determine which molecules present in the gas have attached to the surface of the various sensitive sites.

In this regard, FIGS. 1A and 1B illustrate an example of an electronic nose such as described in patent application WO2018/158458. This type of electronic nose 1 generally comprises a fluidic supplying device 10 for supplying target compounds, an SPR-imaging measuring device 20, and a processing unit (not shown).

The measuring device 20 comprises a measurement chamber 21 intended to receive the gas sample, in which chamber is located a measurement carrier 22 on which is located a matrix-array of sensitive sites $23_k$. The measurement carrier 22 is formed from a metal layer to which are fastened various receptors suitable for interacting with the compounds of interest, the various receptors being arranged so as to form sensitive sites $23_k$ that are distinct from one another. These receptors are then located at the interface between the metal layer and a dielectric medium, here a gaseous medium.

This measuring device 20 further comprises a light source 24 for emitting an excitation optical signal and an image sensor 25. At least one focusing or collimating lens and at least one polarizer may be provided on the optical path between the light source 24 and the image sensor 25, in a known manner. The light source 24 is designed to emit the excitation optical signal in the direction of the measurement carrier 22, at a working angle θR allowing surface plasmons to be generated thereon. The reflected portion of the excitation optical signal, forming a measurement optical signal, is then detected by the image sensor 25. The intensity of the measurement optical signal depends locally on the refractive index of the measurement carrier 22, which itself depends on the surface plasmons generated and on the amount of material located at each sensitive site $23_k$, this amount of material varying over time depending on the interactions between the sensitive compounds and the receptors.

The processing unit of the electronic nose 1 is suitable for analyzing "sensorgrams," i.e., signals corresponding to the time evolution of the parameter representative of the adsorption/desorption interactions of the compounds of interest with the receptors of each of the various sensitive sites $22_k$, with the aim of extracting therefrom information on the kinetics of the interaction (adsorption and desorption) of the compounds of interest with the receptors. These sensorgrams may be measurement signals $S_k(t)$ corresponding to the intensity of the measurement optical signal detected in real time by the image sensor 25 of each of the sensitive sites $23_k$, or be "useful" signals $Su_k(t)$ corresponding to the time evolution of the variation $\Delta\% R_k(t)$ of the reflectivity associated with each of the sensitive sites $23_k$. The reflectivity % R is defined as the ratio of the intensity of the measurement optical signal detected by the image sensor 25 to the intensity of the excitation optical signal emitted by the light source 24. The variation in reflectivity $\Delta\% R$ is obtained by subtracting from the time evolution of the reflectivity % R(t) a baseline associated with just the gas present inside the measurement chamber, independently of the compounds of interest.

Hence, the useful signals $Su_k(t)$ associated with the various sensitive sites $23_k$ have the same steady-state initial value (which is preferably substantially equal to zero) before the compounds of interest are introduced into the measurement chamber 21. Thus, this baseline, which expresses the impact of just the gas (without the compounds of interest) on each of the sensitive sites $23_k$, is subtracted from the corresponding measurement signal $S_k(t)$. The intensity of the useful signals $Su_k(t)$ thus expresses the impact of just the compounds of interest on the receptors of the measurement chamber 21.

Lastly, the fluidic supplying device 10 is suitable for introducing the compounds of interest into the measurement chamber 21, under conditions that allow analysis of the sensorgrams and, therefore, characterization of the compounds of interest. In this regard, the article by Brenet et al., entitled *Highly-Selective Optoelecironic Nose based on Surface Plasmon Resonance Imaging for Sensing Gas Phase Volatile Organic Compounds*, Anal. Chem. 2018, 90, 16, 9879-9887, describes a method for characterizing a gas sample using an SPR-imaging electronic nose 1.

The characterizing method consists in supplying the measurement chamber with a gas sample in such a way that the kinetics of interaction between the compounds of interest and the receptors reach a steady-state equilibrium regime.

More precisely, as illustrated in FIG. 1C, the step of fluid injection comprises in succession:
- a first phase Pa, called the initial phase, in which just a reference gas, without the compounds of interest, is injected into the measurement chamber. This reference gas is generally identical to the carrier gas of the gas sample;
- a second phase Pb, called the characterizing phase, in which the gas sample, formed from the carrier gas and from the compounds of interest, is injected into the measurement chamber; and
- a third phase Pc, called the dissociating phase, in which just the reference gas is again injected into the measurement chamber, so as to purge the compounds of interest from the measurement chamber.

The initial phase Pa allows the aforementioned baseline to be acquired, which baseline is intended to then be subtracted from the measurement signals $S_k(t)$ with a view to obtaining useful signals $Su_k(t)$ (in other words the time evolution of the variation in reflectivity $\Delta\% R_k(t)$ for each sensitive site). As mentioned above, this step of fluid injection is carried out so that the sensorgrams feature a transient assimilation regime followed by a steady-state equilibrium regime. When this steady-state equilibrium regime is reached, the (steady-state) equilibrium values of the useful signals $Su_k(t)$ are extracted by the processing unit, and define the signature of the compounds of interest.

However, it turns out that the relative humidity inside the measurement chamber has an impact on the intensity of the measurement optical signal, as indicated in the article by Shao et al., entitled *Mechanism and Characteristics of Humidity Sensing with Polyvinyl Alcohol-Coated Fiber Surface Plasmon Resonance Sensor*, Sensors 2018, 18, 2029, In this article, the authors use an SPR sensor as a humidity sensor. However, in the context of a method for characterizing compounds of interest using an electronic nose, the variation in relative humidity in the measurement chamber forms a measurement bias that negatively affects the quality of the characterization. In addition, in the case where the relative humidity varies over long periods of time, and, therefore, varies from one characterization to the next for the same compounds of interest and the same operating conditions, this results in drift over time that makes the signatures of these same compounds of interest different from one another.

BRIEF SUMMARY

The objective of the disclosure is to at least partially remedy the drawbacks of the prior art, and more particularly to provide a method for recalibrating an electronic nose suitable for characterizing target compounds present in a gas sample introduced into a measurement chamber, the latter comprising at least one sensitive site having receptors with which the target compounds are able to interact via adsorption/desorption, the electronic nose comprising a processing unit in which is pre-stored a first correction function expressing a variation in a parameter representative of the measurement signal associated with a reference gas as a function of a relative humidity, the method comprising the following steps:
- successive injections, into the measurement chamber, of reference gas not containing target compounds, the reference gases injected one after the other having various predetermined non-zero values of relative humidity;
- determining, in the course of each injection, a measurement signal representative of the interactions of the receptors with the reference gas present, at various measurement times, in response to an excitation signal transmitted to the sensitive site, then determination, for each reference gas, of a baseline representative of the determined measurement signal, the baseline being associated with the relative humidity of the reference gas present;
- determining a second correction function expressing a variation in a parameter representative of the measurement signal associated with the reference gas as a function of relative humidity, on the basis of the determined baselines and of the predetermined values of relative humidity ($\phi$), the second correction function then being stored in the processing unit instead of the first correction function.

The baseline may be an average of at least one portion of the corresponding measurement signal; and the parameter representative of the measurement signal may be equal to the baseline.

The step of successive injections may comprise at least three injections of various reference gases one after the other, from various reservoirs.

The step of successive injections may comprise an injection of a given reference gas, the given reference gas being drawn from a reservoir in which it has an initial relative-humidity value and passing, before it reaches the measurement chamber, through a reservoir partially filled with a hydrophilic liquid, so that the reference gas introduced into the measurement chamber has a relative humidity that decreases from the initial value to a final value through an intermediate value.

The step of successive injections may comprise a plurality of injection cycles, each cycle being formed from an injection of a first reference gas having a first relative humidity and of an injection of various second reference gases having various second relative humidities, so as to obtain a plurality of relative-humidity differences between each second relative humidity and the first relative humidity, the relative-humidity differences being different from one another.

The electronic nose may comprise a first source of the first reference gas having a first relative humidity, and various second sources of second reference gases having the various second relative humidities.

The parameter representative of the measurement signal may be equal to a reference difference between baselines associated with the first reference gas and with each second reference gas, each reference difference being different from the others.

The disclosure also relates to a method of use of the electronic nose, comprising a plurality of phases of characterizing target compounds, including a first characterizing phase performed before a recalibration achieved via the method as claimed in any one of the preceding features, and a second characterizing phase performed after the recalibration, each characterizing phase comprising the following steps:

injection into the measurement chamber, during a first phase Pa, of a reference gas not containing the target compounds, then during a second phase Pb, of a gas sample comprising the target compounds;

determination, in the course of the injection step, of a measurement signal representative of the interactions of the receptors with at least the gas present, at various measurement times, in response to an excitation signal transmitted to the sensitive site;

measurement of relative-humidity values $\phi 1$, $\phi 2$ in the first and second phases Pa, Pb in the measurement chamber, respectively, $\phi 2$ being different from $\phi 1$;

determination of a corrective parameter associated with the sensitive site, on the basis of at least the measured relative-humidity value $\phi 2$ and of a predetermined correction function ($f_k$, $h_k$) expressing a variation in a parameter representative of the measurement signal associated with the reference gas as a function of relative humidity;

determination of a useful signal via correction of the measurement signal associated with the gas sample, on the basis of at least the determined corrective parameter;

the first characterizing phase using a pre-stored first correction function; the recalibration determining a second correction function; the second characterizing phase using the determined second correction function.

The disclosure also relates to an electronic nose for characterizing target compounds, the electronic nose being suitable for implementing the recalibrating method according to the above features and the method of use according to the above feature, and comprising:

a measuring device, comprising: a measurement chamber suitable for receiving a gas sample containing compounds of interest to be characterized, and comprising at least one sensitive site having receptors with which the target compounds are able to interact via adsorption/desorption; a measuring unit suitable for determining a measurement signal representative of the interactions of the receptors with at least the gas present, at various measurement times, in response to an excitation signal transmitted to the sensitive site; a humidity sensor suitable for measuring relative-humidity values of the gas present in the measurement chamber;

a fluidic supplying device, comprising: a source of a reference gas, which source is connected to the measurement chamber; a source of target compounds, which source is connected to the measurement chamber, the gas sample being formed from a gas and from the target compounds;

a fluidic recalibrating device, comprising at least one source of at least one reference gas, the source being suitable for supplying the measurement chamber with reference gases having various relative-humidity values;

a processing unit, suitable for:

determining a corrective parameter on the basis of at least one measured relative-humidity value, and of a predetermined correction function associated with the sensitive site and expressing a variation in a parameter representative of the measurement signal associated with a reference gas as a function of the measured relative humidity;

determining a useful signal via correction of the measurement signal associated with the gas sample on the basis of at least the determined corrective parameter;

characterizing the target compounds on the basis of the determined useful signal;

determining the correction function, on the basis of the various relative-humidity values of the reference gas present in the measurement chamber, and of the corresponding measurement signals.

BRIEF DESCRIPTION OF THE DRAWINGS

Other aspects, aims, advantages and features of the disclosure will become more clearly apparent on reading the following detailed description of preferred embodiments thereof, this description being given by way of non-limiting example and with reference to the appended drawings, in which.

DETAILED DESCRIPTION

Figure 1A:
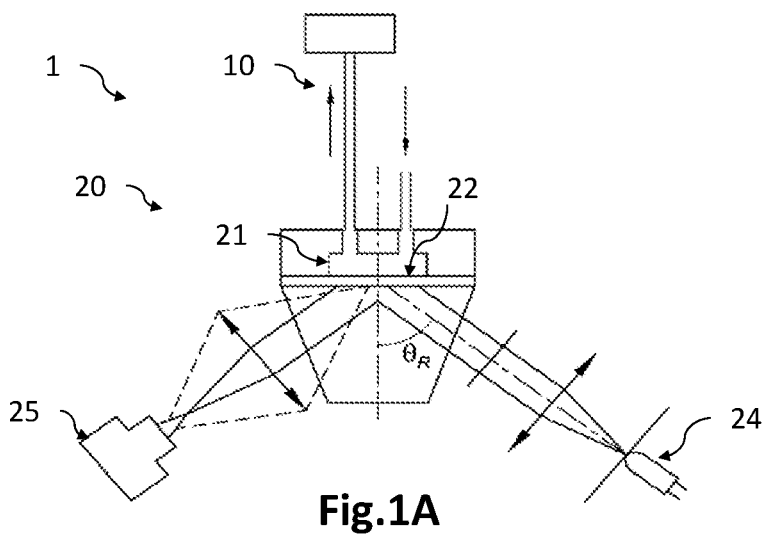
FIGS. 1A and 1B, which have already been described, are schematic and partial views, in cross section (FIG. 1A) and seen from above (FIG. 1B), of an SPR-imaging electronic nose according to one example of the prior art and of the sensitive sites of the measurement carrier.

In the figures and in the remainder of the description, the same references have been used to designate identical or similar elements. In addition, the various elements have not been shown to scale for the sake of clarity of the figures. Moreover, the various embodiments and variants are not mutually exclusive and may be combined with one another. Unless indicated otherwise, the terms "substantially," "about" and "of the order of" mean to within 10%, and preferably to within 5%, Moreover, the terms "comprised between . . . and . . . " and equivalents mean inclusive of limits, unless indicated otherwise.

The disclosure relates to the characterization of compounds of interest present in a carrier gas forming a gas sample to be analyzed. Characterization is carried out by means of an analysis system called an "electronic nose," which comprises: a measuring device with a humidity sensor; a fluidic device for supplying target compounds; and a processing unit. As detailed below, the electronic nose also comprises a fluidic recalibrating device, so that the electronic nose is suitable for carrying out a recalibrating phase allowing the correction function used to correct the measurement bias related to a variation in relative humidity in the measurement chamber to be updated.

By way of illustration, the electronic nose uses surface-plasmon-resonance (SPR) measurement technology. The measuring device then comprises an optical sensor that may be an image sensor, the measurement chamber then having a plurality of sensitive sites $6_k$ (k being the rank of the sensitive site in question), or that may be a photodetector, in which case the measurement is carried out by searching for the minimum reflectivity angle, this angle being representative of the variation in index when an amount of material is deposited on an elementary area. SPR technology often uses an image sensor (SPRI for SPR Imaging) that allows the amounts of materials deposited at any point on a surface to be measured, the optimum angle of adjustment of the sensor being an average minimum reflectivity angle, and the grayscale levels of the image being representative of variations in refractive index related to surface deposits of material. As a variant, other measurement technologies may be implemented, such as measurement using MEMS or NEMS electromagnetic resonators (as described in document EP3184485, for example). More broadly, the measuring device may be a resistive, piezoelectric, mechanical, acoustic or optical measuring device.

Generally, by "characterization" what is meant is obtainment of information representative of the interactions of the compounds of interest contained in the gas sample with the receptors of the one or more sensitive sites of the electronic nose. The interactions in question are here events resulting in the compounds of interest adsorbing on and/or desorbing from the receptors. This information thus forms an interaction pattern, or in other words a "signature" of the compounds of interest, this pattern being representable, for example, in the form of a histogram or of a radar chart. More precisely, in the case where the electronic nose comprises N distinct sensitive sites, the interaction pattern is formed by N scalar or vectorial representative items of information, these being obtained from the measurement signal associated with the sensitive site in question.

Generally, the compounds of interest (analytes) are elements intended to be characterized by the electronic nose, and contained in a gas sample. They may be, by way of illustration, bacteria, viruses, proteins, lipids, volatile organic molecules, inorganic compounds, inter alia. Moreover, the receptors (ligands) are elements that are fastened to the sensitive sites and that are able to interact with the compounds of interest, though the chemical and/or physical affinities between the sensitive compounds and the receptors are not necessarily known. The receptors of the various sensitive sites preferably have different physico-chemical properties, which have an impact on their ability to interact with the compounds of interest. It may be a question, by way of example, of amino acids, peptides, nucleotides, polypeptides, proteins, organic polymers, inter alia.

Figure 1B:
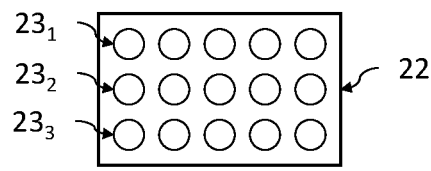
Figure 1C:
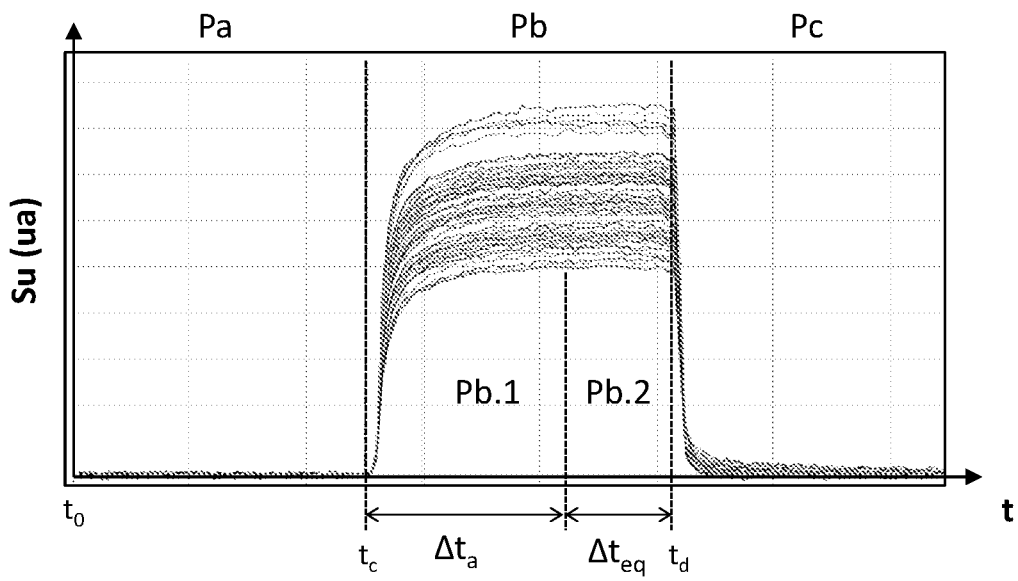
FIG. 1C is an example of sensorgrams $Su_k(t)$ measured by the electronic nose according to the example of the prior art, these sensorgrams corresponding here to the time evolution of the variation in the reflectivity $\Delta\% R_k(t)$ associated with each of the sensitive sites.

FIG. 1C, which was partially described above, illustrates an example of sensorgrams $Su_k(t)$ associated with sensitive sites $23_k$ of an SPR-imaging electronic nose 1, in the context of a characterizing method in which the sensorgrams each have a profile that is said to be conventional, i.e., they feature a regime of equilibrium (i.e., a steady state) in the interactions between the compounds of interest and the receptors. In this example, the relative humidity $\phi$ does not vary substantially between the initial phase Pa and the characterizing phase Pb.

A sensorgram $Su_k(t)$ corresponds to the time evolution of a characterization parameter representative of the interactions between the compounds of interest and the receptors of a sensitive site $23_k$ in question. The parameter is determined based on the intensity of the measurement signal $S_k(t)$ generated by the sensitive site $23_k$ in response to the emission of an excitation signal. In this example, the characterization parameter is the variation $\Delta\% R_k(t)$ in the reflectivity $\% R_k(t)$ associated with the sensitive site $23_k$ with respect to a baseline, but it may be, in another configuration of the electronic nose, the variation in the transmission coefficient. The variation in the reflectivity $\Delta\% R_k(t)$ is here correlated with the modification of the refractive index of the sensitive site $23_k$ in question, which is dependent on the adsorption and desorption interactions of the compounds of interest with the receptors of the sensitive site $23_k$.

In a known manner, a sensorgram $Su_k(t)$ of conventional profile exhibits an initial phase Pa, a phase Pb characterizing the compounds of interest, and then a dissociating phase Pc.

The y-axis value of the sensorgram $Su_k(t)$ is notably proportional to the number of receptors of the sensitive site $23_k$ in question.

The initial phase Pa corresponds to the introduction into the measurement chamber 21, from time $t_0$ to time $t_c$, of a reference gas (not containing the compounds of interest). The measurement signals $S_k(t)$, in other words the time evolution of the reflectivity % $R(t)$ determined for each sensitive site $23_k$ between characterize the environment in the measurement chamber for each of the sensitive sites $23_k$. Therefrom a baseline $S_k^b$, which generally differs from one sensitive site $23_k$ to the next, is then deduced and then subtracted from the measurement signal $S_k(t)$ to obtain the useful signal $Su_k(t)$ illustrated in FIG. 1C. Thus, the sensorgrams illustrate the useful signals $Su_k(t)$, which therefore have, in the initial phase Pa, the same initial value close to zero for all of the sensitive sites $23_k$.

The injecting phase Pb corresponds to the introduction into the measurement chamber 21, from time $t_c$ to time $t_d$, of a gas sample (carrier gas and compounds of interest, and optionally an odorless gas-phase diluent). This phase comprises a transient assimilation regime Pb.1 followed by a steady-state equilibrium regime Pb.2. In this example, the relative humidity $\phi$ is constant in the various phases Pa, Pb and Pc.

The transient assimilation regime Pb.1 corresponds to the gradual but exponential increase (approximation of the Langmuir adsorption model) in the interactions between the compounds of interest and the receptors, as the compounds of interest are injected into the measurement chamber 21. The exponential growth of the sensorgrams in the assimilation regime is due to the fact that there are then many more adsorption events than desorption events.

It will be noted that, in this regard, the interaction between a compound of interest A (A standing for analyte) and a receptor L (L standing for ligand) is a reversible effect characterized by a coefficient $k_a$ (in mol$^{-1}$·s$^{-1}$) of adsorption of the compound of interest A on the receptor L to form a compound of interest/receptor pair LA (LA standing for ligand-analyte), and by a coefficient $k_b$ (in s$^{-1}$) of desorption corresponding to the dissociation of the compound LA. The ratio $k_d/k_a$ is none other than the equilibrium dissociation coefficient $k_D$ (in mol) that gives the value of the concentration $c_A$ of compounds of interest A allowing 50% of the receptors L to be saturated.

The steady-state equilibrium regime Pb.2 is reached when the concentration $c_{LA}(t)$ of compounds LA remains steady $dc_{LA}/dt=0$, i.e., when the product of the constant $k_a$ multiplied by the concentrations of compounds of interest $c_A(t)$ and of receptors $c_L(t)$ (number of adsorption events) is equal to the product of the constant $k_d$ multiplied by the concentration $c_{LA}(t)$ of compounds LA (number of desorption events), or in other words when the following rate equation is satisfied $dc_{LA}/dt=k_a \times c_A \times c_L - k_d \times c_{LA}=0$. The maximum steady-state value of the measurement signal is proportional to the concentration $c_A(t)$ of compounds of interest A. Saturation of the receptors L at the sensitive site may be achieved when the concentration $c_A$ of compounds of interest A is sufficient.

The dissociating phase Pc corresponds to a step of removing the compounds of interest present in the measurement chamber, from the time $t_d$, so that the concentration of compounds LA decreases, usually exponentially. This may be done by once again introducing the same reference gas into the measurement chamber.

However, it has been observed that the variation in the relative humidity within the measurement chamber 21 in the course of the characterizing phase generates a measurement bias that adversely affects the quality of the characterization. This measurement bias is a bias related to a non-zero difference in the relative humidity within the measurement chamber 21 between the initial phase Pa and the characterizing phase Pb. It is a measurement bias insofar as it results from a variation as a function of time in a parameter (here the relative humidity) that characterizes the environment inside the measurement chamber and that should theoretically remain steady over time. It is called here "measurement bias" rather than "measurement noise" since it is a question of a variation in the measurement signal that is deterministic and not random in character. This variation in humidity may result from a difference in water content between the reference gas injected in the initial phase Pa, which is often ambient air, and the odorous gas, which is often ambient air mixed with an effluvium (gas sample injected in the injecting period Pb), this effluvium possibly being characterized by one or more hydrophilic or hydrophobic molecules, or indeed may result from a source material the emanations of which contain more water than the ambient air (e.g., food being cooked).

In other words, the relative humidity may have a first value $\phi 1$ that is substantially constant in the initial phase Pa, and a second value $\phi 2$ that is substantially constant but different from the value $\phi 1$ in the characterizing phase Pb. The relative-humidity difference $\Delta\phi$ is defined here as being equal to $\phi 2-\phi 1$, By relative humidity $\phi$, what is meant is the water-vapor content of the gas present in the measurement chamber, and here of the carrier gas. It is the ratio between the partial pressure of the water vapor contained in the gas present and the saturation vapor pressure at the same temperature.

This measurement bias is notably present when the gas sample has a relative humidity $\phi 2$ that is different from, and, for example, lower than, the relative humidity $\phi 1$ of the reference gas introduced in the initial phase Pa. Thus, in the initial phase Pa, the reference gas may be moist air of relative humidity $\phi 1$ obtained from the environment of the electronic nose 1. In the characterizing phase Pb, the gas sample is made up of moist air obtained, for example, from the environment of the electronic nose 1, and of compounds of interest obtained from a reservoir 12. However, the relative humidity $\phi 2$ of the gas sample may be different from $\phi 1$. This is because the relative humidity of the moist air obtained from the environment may have changed. Another possible explanation for the variation in relative humidity between $\phi 1$ and $\phi 2$ is the relative humidity of the gas present in the headspace of the reservoir 12 containing the target compounds. Specifically, to form the gas sample, the moist air at $\phi 1$ obtained from a carrier-gas source 11 is introduced into the reservoir 12 and mixed with the gas present (compounds of interest and gas-phase diluent). However, the liquid-phase diluent may be hydrophilic, and hence it may lead to a decrease in the relative humidity $\phi$ of the moist air introduced into the headspace of the reservoir 12. Consequently, the gas sample will have a relative humidity $\phi 2$ lower than $\phi 1$ and that may not remain constant.

It will be noted that a thermodynamic equilibrium may gradually be reached in the headspace of the reservoir 12, such that the hydrophilic liquid-phase diluent no longer causes a continuous decrease in the relative humidity of the moist air introduced into the headspace. Thus, in this particular case, the relative humidity of the gas sample in the measurement chamber 21 will gradually tend toward a value substantially equal to $\phi 1$, and hence the measurement bias, which is associated with the difference $\Delta\phi$ in relative humidity between the phases Pa and Pb, will decrease over time. Be that as it may, until thermodynamic equilibrium is reached the various successive characterizations will yield signatures that will not be identical over time (the signatures will drift as a function of time).

This underlying problem of measurement bias related to Δϕ is particularly serious when the characterizing method is performed based on useful signals $Su_k(t)$, i.e., when it comprises a step of subtracting the baseline $S_k^b$ from the corresponding measurement signal $S_k(t)$. Specifically, the aim of this step is to exclude from the characterization of the compounds of interest the effect associated with their environment and notably the effect of the carrier gas. However, it has been observed that while this baseline $S_k^b$ is representative of the carrier gas in the initial phase Pa, it is not necessarily representative of the carrier gas in the characterizing phase Pb as the physical properties of this carrier gas in the measurement chamber may have changed (variation in relative humidity).

Figure 2A:
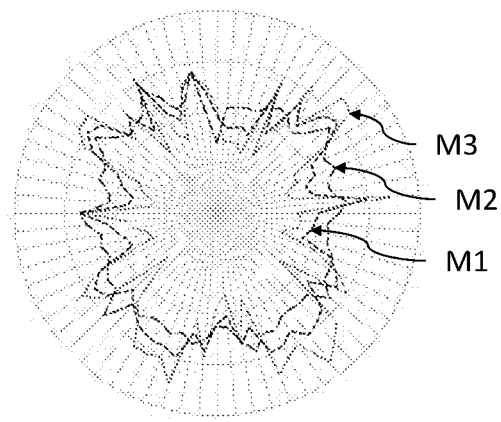
FIG. 2A is an example of three interaction patterns (signatures) obtained using a characterizing method according to the prior art, showing the deterioration in the characterization of compounds of interest due to a relative-humidity difference in the measurement chamber between the initial phase Pa and the characterizing phase Pb.

FIG. 2A illustrates three interaction patterns, or signatures, expressing the characterization of various gas samples, this characterization being performed using a characterizing method according to one example of the prior art. These interaction patterns M1, M2 and M3 are here representations in the form of a radar chart of (steady-state) equilibrium values determined from the sensorgrams $Su_k(t)$ in the steady-state equilibrium regime Pb.2. They allow the effect of the relative-humidity difference Δϕ on the characterization of the compounds of interest to be shown. To obtain these interaction patterns M1, M2, M3 the same carrier gas was used in the three tests, this carrier gas being moist air with an initial relative humidity ϕ1 of about 12%.

A first signature M1 corresponds to a gas sample formed from moist air with a relative humidity ϕ2 equal to about 50% and in which the compounds of interest are butanol molecules. A relatively large variation in the relative humidity in the measurement chamber 21, which here ranged from ϕ1 equal to about 12% in the initial phase Pa, to ϕ2 equal to about 50% in the characterizing phase, was thus observed when the characterizing method was implemented. Thus, the baseline $S_k^b$ was determined using the reference gas (moist air at ϕ1 of 12%), and the equilibrium value was determined using the gas sample (moist air at ϕ2 of 50% with the compounds of interest) after subtraction of the baseline $S_k^b$. This relative-humidity difference Δϕ thus formed a measurement bias. It is important to limit the effect of this measurement bias, so that the interaction pattern M1 is actually representative only of the butanol molecules.

A second signature M2 corresponds to a second gas sample formed from moist air with a relative humidity ϕ2 substantially equal to ϕ1 (i.e., 12%), and in which the compounds of interest are also butanol molecules. When the characterizing method was implemented it was possible, by subtracting the baseline $S_k^b$ associated with the reference gas (moist air at ϕ1), and insofar as the variation in relative humidity Δϕ was zero, to eliminate the effect of the gaseous environment and thus to characterize only the interactions of the compounds of interest with the receptors. Thus, the signature M2 is representative only of the compounds of interest since there is no measurement bias associated with a variation in relative humidity Δϕ. It will be noted that the signature M1 does not overlap with the signature M2, this being indicative of the presence of the measurement bias associated with Δϕ in the case of M1. It is, therefore, important to be able to correct the signature M1, so as to tend toward the signature M2, which is the representative only of the compounds of interest, even though there is a difference in relative humidity Δϕ in the measurement chamber between the initial phase Pa and the characterizing phase Pb.

The third signature M3 corresponds to a reference gas formed only from moist air with a relative humidity ϕ2 equal to about 50% (no target compounds). Here, the impact only of the variation in relative humidity Δϕ on the characterization of moist air by the electronic nose 1, in the absence of compounds of interest, was measured. It may be seen that the increase in relative humidity Δϕ between the initial phase Pa and the characterizing phase Pb results in an increase in the variation in reflectivity Δ% $R_k$ of the sensitive sites $23_k$. It will be noted that the signature M1 (gas sample made up of moist air with Δϕ non-zero and of compounds of interest) is located between the signature M2 (gas sample made up of moist air with Δϕ zero and of compounds of interest) and the signature M3 (moist air with Δϕ non-zero containing no compounds of interest), clearly showing the effect of the measurement bias associated with the non-zero relative-humidity difference Δϕ on the signature of the compounds of interest. It is, therefore, important to be able to limit or even eliminate this measurement bias to improve the quality of the characterization of the compounds of interest.

Figure 2B:
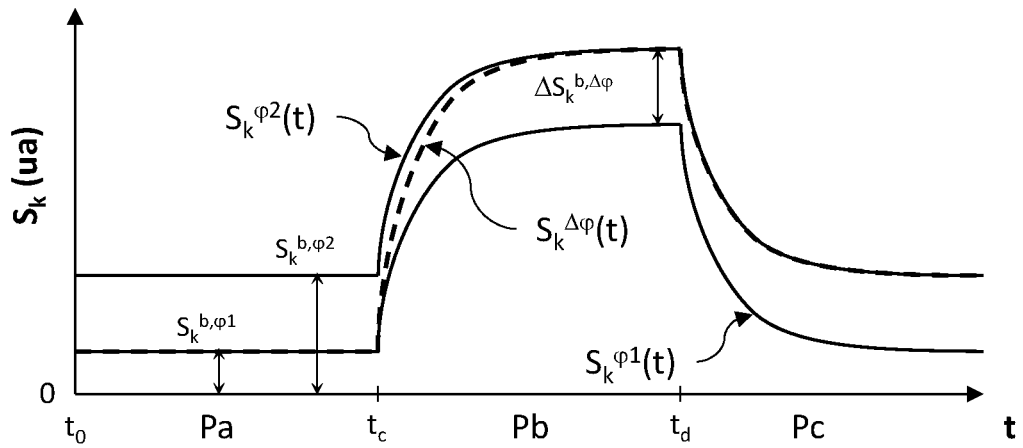
FIG. 2B is an example of various measurement signals $S_k(t)$ obtained using an SPR-imaging electronic nose in various situations in respect of the relative humidity $\phi$ in the measurement chamber: i.e., in the case where the relative humidity is constant and equal to $\phi 1$, in the case where the relative humidity is constant and equal to $\phi 2$; $\phi 2$ being different from $\phi 1$, and in the case where the relative humidity passes from $\phi 1$ to $\phi 2$ between the initial phase Pa and the characterizing phase Pb.

FIG. 2B illustrates examples of measurement signals $S_k(t)$ for various gas samples, thus also showing the impact of the measurement bias associated with the variation in relative humidity Δϕ on the characterization of the compounds of interest. In these examples, the reference gas (injected in the phase Pa) and the carrier gas of the gas sample (injected in the phase Pb) are moist air.

The measurement signal $S_k^{\Phi 1}(t)$ corresponds to the case where the relative humidity in the measurement chamber 21 remains constant and equal to ϕ1 during the initial phase Pa and during the characterizing phase Pb. The variation in relative humidity Δϕ is then zero (no associated measurement bias). It has a non-zero baseline $S_k^{b,\Phi 1}$, which corresponds to the response of the electronic nose 1 when the reference gas (moist air at ϕ1 containing no compounds of interest) is in the measurement chamber 21 in the initial phase Pa.

The measurement signal $S_k^{\Phi 2}(t)$ corresponds to the case where the relative humidity in the measurement chamber 21 remains constant and equal to ϕ2 during the initial phase Pa and during the characterizing phase Pb. The variation in relative humidity Δϕ is then zero (no associated measurement bias). The relative humidity ϕ2 is here higher than ϕ1. It has a non-zero baseline $S_k^{b,\Phi 2}$ which is different from $S_k^{b,\Phi 1}$ and which corresponds to the response of the electronic nose 1 when the reference gas (moist air at ϕ2 containing no compounds of interest) is in the measurement chamber 21 in the initial phase Pa.

The measurement signal $S_k^{\Delta\Phi}(t)$ corresponds to the case where the relative humidity in the measurement chamber 21 does not remain constant, and passes from the value ϕ1 in the initial phase Pa to the value ϕ2 in the characterizing phase Pb. The variation in relative humidity Δϕ is then non-zero, and here positive. It has the same baseline $S_k^{b,\Phi 1}$ as the measurement signal $S_k^{\Delta\Phi}(t)$, insofar as the reference gas has the relative humidity ϕ1 in the initial phase Pa. However, it has the same equilibrium value as the measurement signal $S_k^{\Phi 2}(t)$ insofar as the gas sample has the relative humidity ϕ2 in the characterizing phase Pb. Thus, the measurement signal $S_k^{\Delta\Phi}(t)$ gradually passes from the measurement signal $S_k^{\Phi 1}(t)$ in the initial phase Pa to the measurement signal $S_k^{\Phi 2}(t)$ in the characterizing phase Pb. The measurement bias then has a magnitude of the order of $\Delta S_k^{b,\Delta\Phi}$ corresponding to the difference between $S_k^{b,\Phi 2}$ and $S_k^{b,\Phi 1}$. To characterize only the compounds of interest, it is thus necessary to be able to reduce or even eliminate the measurement bias $\Delta S_k^{b,\Delta\phi}$ in the measurement signal $S_k^{\Delta\phi}(t)$.

Figure 2C:
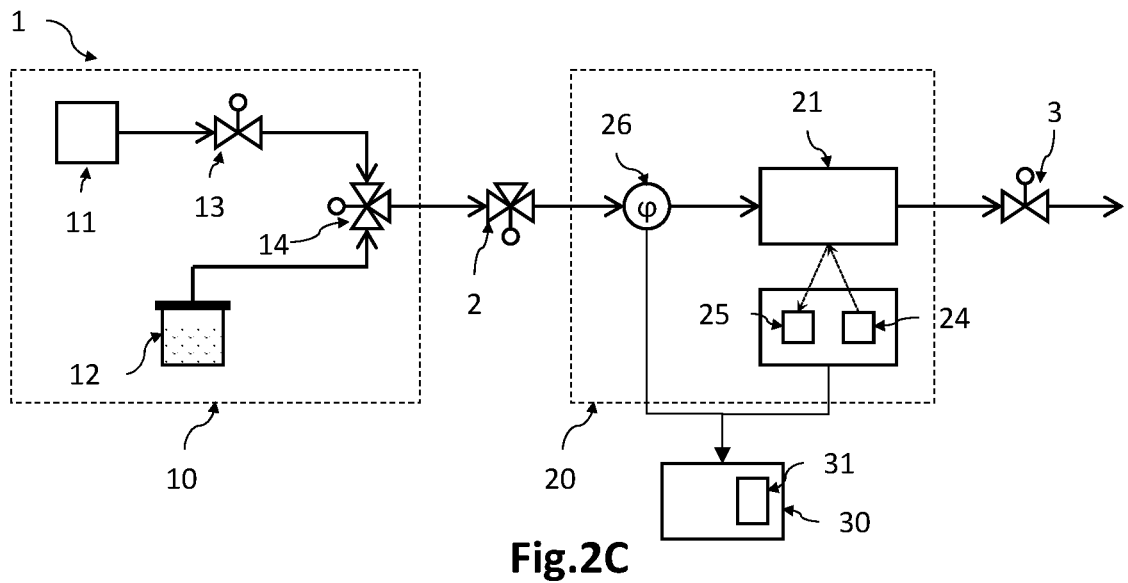
FIG. 2C is a schematic and partial view of an SPR-imaging electronic nose according to one embodiment in which the nose is suitable for correcting a measurement bias associated with a variation in relative humidity in the characterizing phase.

FIG. 2C is a schematic and partial view of an electronic nose 1 according to one embodiment in which the nose is suitable for correcting the measurement bias $\Delta S_k^{b,\Delta\phi}$ associated with the variation in relative humidity $\Delta\phi$ in the measurement chamber 21 in the course of the characterizing phase.

The electronic nose 1 is here an optoelectronic system allowing compounds of interest (for example, odorous molecules, volatile organic compounds, inter alia) contained in a gas sample introduced into a measurement chamber 21, to be characterized. The electronic nose 1 shown in these figures is based here on SPR technology and has, in this example, the features of the Kretschmann configuration, which is known to those skilled in the art, though the disclosure is not, however, limited to this configuration. However, as mentioned above, other measurement techniques may be used, such as measurements of the resonant frequency of a MEMS or NEMS microresonator that is functionalized so that it has at least one sensitive site equipped with receptors.

The electronic nose 1 comprises a plurality of sensitive sites $23_k$ that are distinct from one another and that are located in a measurement chamber 21 that is intended to receive the gas sample to be analyzed, these sensitive sites each being formed from receptors capable of interacting with the compounds of interest to be studied (see FIG. 1B). The sensitive sites $23_k$ are distinct from one another in the sense that they comprise receptors that are different, in terms of chemical or physical affinity with respect to the compounds of interest to be analyzed, and are, therefore, intended to deliver interaction information that differs from one sensitive site $23_k$ to the next. The sensitive sites $23_k$ are distinct regions of a measurement carrier 22, and may be contiguous or spaced apart from one another. The electronic nose 1 may further comprise a plurality of identical sensitive sites $23_k$, for example with the aim of detecting any measurement drift and/or of allowing the identification of a defective sensitive site.

The electronic nose 1 comprises a measuring device 20, here an SPR imaging device, allowing, for each sensitive site $23_k$, the interactions of the compounds of interest with the receptors to be quantified, here via measurement in real time of the intensity of a measurement optical signal obtained for the sensitive site $23_k$, in question, this optical signal being a portion, here a reflected portion, of an excitation optical signal emitted by a light source 24. The intensity of the measurement optical signal detected by the optical sensor 25 is notably directly correlated with the adsorption/desorption interactions of the compounds of interest with the receptors. In the case of techniques for measuring the resonant frequency of a NEMS or MEMS microresonator, the measurement signal may be an electrical signal representative of the vibration of a microbeam or the like.

In the context of measurement by SPR imaging, the measuring device 20 is suitable for acquiring, in real time, the measurement optical signal from all of the sensitive sites $23_k$. Thus, the measurement optical signals issued from the sensitive sites $23_k$ in response to the excitation optical signal are detected together and in real time, in the form of an image acquired by the same optical sensor 25.

Thus, the measuring device 20 comprises a light source 24 suitable for transmitting an optical signal, referred to as the excitation optical signal, in the direction of the sensitive sites $23_k$, and for generating surface plasmons on the measurement carrier 22. The light source 24 may be formed from a light-emitting diode, the emission spectrum of which has an emission peak centered on a central wavelength $\lambda_c$. Various optical elements lenses, polarizer, etc.) may be placed between the light source 24 and the measurement carrier 22.

The measuring device 20 further comprises an optical sensor 25, and here an image sensor, i.e., a matrix-array optical sensor suitable for collecting or detecting an image of the optical signal issued from the sensitive sites in response to the excitation optical signal. The image sensor 25 is a matrix-array photodetector, a CMOS or CCD sensor for example. It therefore comprises a matrix-array of pixels whose spatial resolution is such that, preferably, a plurality of pixels acquires the measurement optical signal issued from a given sensitive site $23_k$.

The processing unit 30 allows the processing operations described below in the context of the characterizing method to be implemented. It may comprise at least one microprocessor and at least one memory 31. It is connected to the measuring device 20, and more precisely to the image sensor 25. It comprises a programmable processor able to execute instructions stored on a data storage medium. It further comprises at least one memory 31 containing the instructions required to implement the characterizing method. The memory 31 is also suitable for storing the information computed at each measurement time.

As described below, the processing unit 30 is notably suitable for storing and processing a plurality of images, called elementary images, acquired at a given sampling frequency $f_e$ in a measurement period $\Delta t$, in order to determine, at the current time $t_i$, a measurement signal $S_k(t_i)$ associated with the sensitive site $23_k$. Preferably, the measurement signal $S_k(t_i)$ corresponds, at a measurement time $t_i$, to the average of the intensity of the optical signal reflected and detected by the image sensor 25 via the pixels associated with the sensitive site $23_k$. The average of the optical intensity detected via the pixels may be calculated for one or more images of the sensitive site $23_k$, as described in detail below.

The fluidic supplying device 10 is suitable for supplying the measurement chamber 21 with a reference gas alone (i.e., containing no compounds of interest) during the initial phase Pa, and with a gas sample made up of a carrier gas and of the compounds of interest in the characterizing phase Pb. The gas sample differs from the reference gas essentially in that it contains the compounds of interest. One or more additional gases may be present, but they are odorless and hence they induce substantially no response on the part of the electronic nose 1. One example of an additional gas present in the gas sample may be the vapor-phase diluent. As described with reference to FIG. 1C, the compounds of interest may be stored in a liquid diluent contained in a reservoir 12. The vapor phase of the diluent and the compounds of interest are added to the carrier gas (e.g., moist air) to form the gas sample. The reference gas and the gas sample differ from each other here also in their relative-humidity value.

To this end, the fluidic supplying device 10 comprises a source 11 of reference gas, and a reservoir 12 of compounds of interest. Here, the reservoir 12 contains a liquid diluent in which the compounds of interest are located. The fluidic supplying device 10 also comprises a valve 13 located downstream of the source 11, and a valve 14 that connects the source 11 and the reservoir 12 to a fluidic duct that communicates with the measurement chamber 21. It thus allows the measurement chamber 21 to be supplied with the reference gas (e.g., moist air with the relative humidity $\phi 1$)

in the initial phase Pa and the dissociating phase Pc, and with the gas sample (e.g., moist air with the relative humidity $\phi2$, compounds of interest, and potentially the vapor-phase diluent) in the characterizing phase Pb. It may be configured to ensure that the concentration of the compounds of interest in the measurement chamber 21 remains constant over time. Moreover, the electronic nose 1 further comprises a humidity sensor 26 able to measure the relative humidity in the measurement chamber 21. This humidity sensor 26 may measure the relative humidity of the gas directly, or may even measure any other physical parameter from which the relative humidity of the gas in question may be deduced. The humidity sensor 26 may be placed in the measurement chamber 21, or upstream (as illustrated) or downstream thereof. It is connected to the processing unit 30, which may further be suitable for computing a relative-humidity difference between the initial phase Pa and the characterizing phase Pb.

Figure 3:
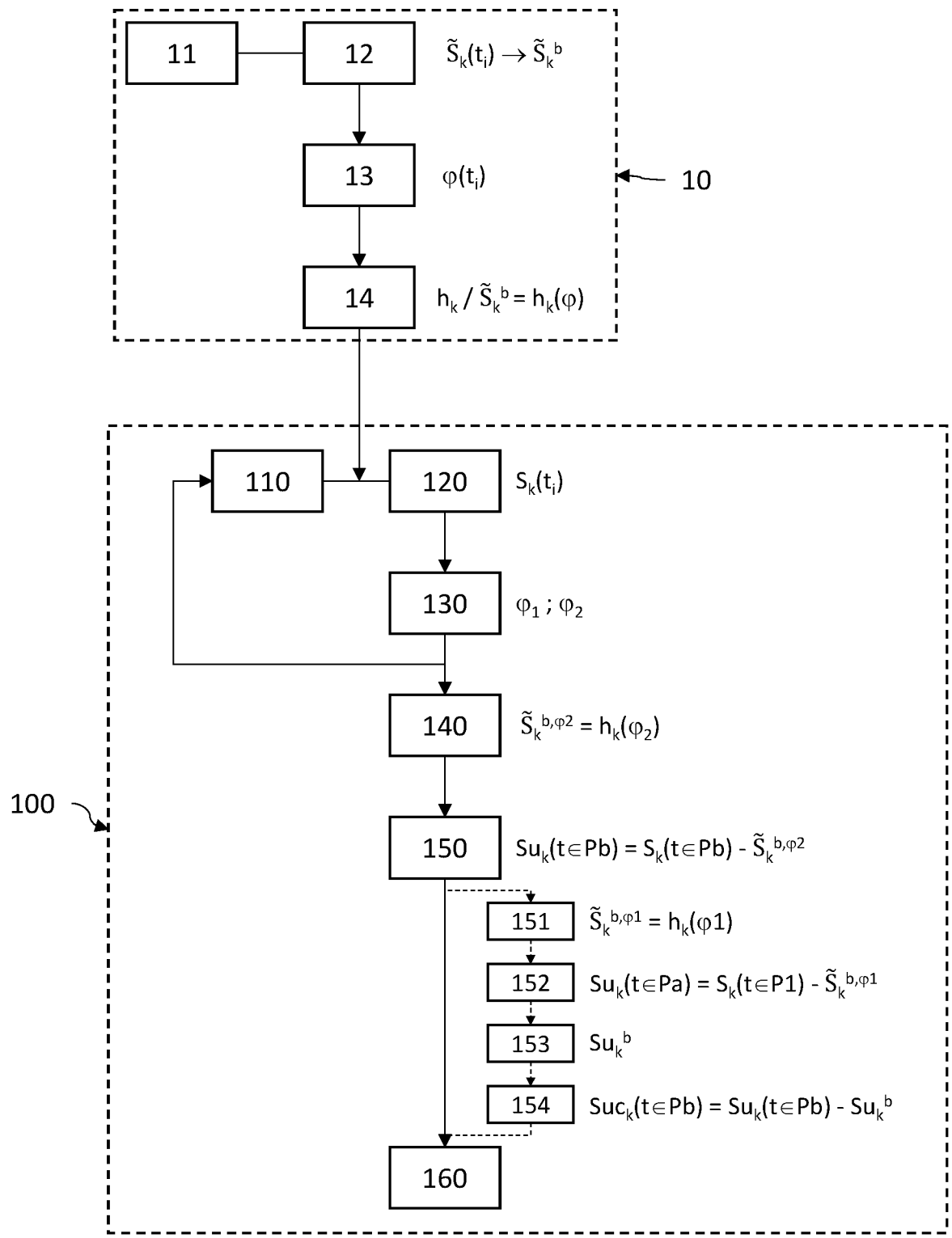
FIG. 3 is a flowchart of a characterizing method according to a first embodiment.

FIG. 3 illustrates a flowchart of a method for characterizing compounds of interest according to a first embodiment, in which the measurement bias $\Delta S_k^{b,\Delta\phi}$ associated with a non-zero relative-humidity difference $\Delta\phi$ is reduced or even eliminated, the relative-humidity difference $\Delta\phi$ in the measurement chamber 21 being defined between a value $\phi1$ in the initial phase Pa and a value $\phi2$ different from $\phi1$ in the characterizing phase Pb. In this embodiment, the useful signal $Su_k(t)$ is corrected on the basis of an estimate of a baseline $\tilde{S}_k^{b,\phi2}$ associated with the reference gas for the relative humidity $\phi2$, this estimate being obtained using a correction function $h_k$.

In a preliminary calibrating phase 10 a correction function $h_k$ associated with each sensitive site $23_k$ is determined. This correction function $h_k$ expresses a variation in a parameter representative of the measurement signal associated with the reference gas introduced in the initial phase Pa as a function of the relative humidity $\phi$. More precisely, the representative parameter is here a baseline of the measurement signal when the reference gas is present in the measurement chamber 21. Here $\tilde{S}_k^b$ denotes the estimated baseline of the measurement signal $\tilde{S}_k(t)$, which estimated baseline is determined in the calibrating phase. More precisely, the tilde sign is placed on the letter S when the measurement signal and its baseline are associated with the correction function. The correction function is a continuous function that may, inter alia, be polynomial or logarithmic. It is parameterized in the calibrating phase 10, as detailed below.

In a first step 110, the step of injection of fluid into the measurement chamber 21 of the electronic nose 1 is performed. This step comprises a first, initial phase Pa of injecting the reference gas (here the carrier gas without the compounds of interest), a second, characterizing phase Pb in the course of which the gas sample is injected (carrier gas with the compounds of interest), and then a third, dissociating phase Pc. The reference gas and the gas sample have different relative humidities, denoted $\phi1$ for the reference gas and $\phi2$ for the gas sample.

In a step 120, for each sensitive site $23_k$ ranging from 1 to N, at the current time $t_i$, a measurement signal $S_k(t_i)$ representative of the reflectivity $\% R_k(t_i)$ of the sensitive site $23_k$ in question, and, therefore, also representative of the response of the electronic nose 1 to the presence in the measurement chamber 21 of the introduced reference gas then gas sample, is determined.

To this end, in the fluid injection step 110, a plurality of images called elementary images $Ie_m$ of the N sensitive sites $23_k$ are acquired. More precisely, the sensitive sites $23_k$ are illuminated with an excitation optical signal able to generate surface plasmons therein, and the reflected portion of the excitation optical signal is detected. The image sensor 25 is connected to the processing unit 30, which stores the acquired images.

The image sensor 25 acquires, over a period $\Delta t$ separating two successive measurement times $t_{i-1}$ and $t_i$, a plurality of images $Ie_m$, called elementary images, of the matrix-array of N distinct sensitive sites, m being the acquisition rank of the elementary image Ie, at a sampling frequency $f_e$. The sampling frequency $f_e$ may be 10 images per second, and the acquisition period $\Delta t$ may be a few seconds, 4 seconds for example.

For each elementary image $Ie_m$, the processing unit determines an elementary optical-intensity value $(I_k)_m$ by taking the average of the optical intensity $(I_k(i,j))_m$ acquired by each pixel i, j associated with a given sensitive site $23_k$, and computes an average value $(\bar{I}_k)_{\Delta t}$ thereof over the acquisition period $\Delta t$. This average value $(\bar{I}_k)_{\Delta t}$ then corresponds to the measurement signal $S_k(t_i)$, at the current time $t_i$, associated with the sensitive site $23_k$.

This step 120 of acquiring and determining the measurement signals $S_k(t_i)$ is carried out in the fluid injection step 110, and reiterated for multiple successive measurement times $t_i$. With each iteration i is associated one measurement time also called the current time.

In a step 130, the relative humidity is measured in the measurement chamber 21 in the phases Pa and Pb. To this end, the humidity sensor 26 measures the relative humidity $\phi$ in the phases Pa and Pb and transmits the measured values to the processing unit 30. The relative humidity $\phi2$ (phase Pb) is here different from the value $\phi1$ (phase Pa). The relative-humidity values $\phi1$ and $\phi2$ may each be an average value of the relative humidity over the phase in question or over a determined period. The relative humidity $\phi1$ is preferably an average value computed over a period that directly precedes the time $t_c$ and, therefore, the characterizing phase Pb. The relative humidity $\phi2$ is preferably an average value computed over a period situated in the steady-state regime Pb.2, and, for example, during a period that directly precedes the time $t_d$ and, therefore, the dissociating phase Pc.

In a step 140, a baseline is determined $\tilde{S}_k^{\phi2}$ representative of the measurement signal associated with the reference gas for a relative humidity $\phi2$. This baseline $\tilde{S}_k^{b,\phi2}$ is computed using the correction function $h_k$ and using the measured value $\phi2$, In other words: $\tilde{S}_k^{b,\phi2}=h_k(\phi2)$.

In a step 150, the measurement signal $S_k(t_i)$ associated with the gas sample, i.e., for $t_i$ belonging to the phase Pb (i.e., $t_i \in Pb$), is corrected by subtracting the determined baseline $\tilde{S}_k^{b,\phi2}$. A useful signal $Su_k(t_i \in Pb)$ is thus obtained. Thus, in the context of this embodiment, the useful signal associated with the gas sample, which therefore contains the compounds of interest, but which has undergone a variation in relative humidity, is computed by correcting its measurement signal $S_k(t_i \in Pb)$ in the phase Pb with the baseline $\tilde{S}_k^{b,\phi2}$ estimated using the correction function $h_k$ and not by subtracting its own baseline $S_k^b$ from it. Specifically, this value $S_k^b$ is associated with the relative humidity $\phi1$ of the reference gas during the phase Pa, whereas the measurement signal of the gas sample is impacted by the measurement bias associated with the difference $\Delta\phi$. Thus, subtracting the baseline $S_k^b$ from the measurement signal $S_k(t_i \in Pb)$ does not allow the measurement bias $\Delta S_k^{b,\Delta\phi}$) to be taken into account. In contrast, subtracting the baseline $\tilde{S}_k^{b,\phi2}$ estimated using the correction function $h_k$ from it allows the relative-humidity difference $\Delta\phi$ to be taken into account.

In a step 160, the compounds of interest are characterized on the basis of the corrected useful signals $Su_k(t_i \in Pb)$. An equilibrium, i.e., steady-state, value is extracted from these signals for each of the sensitive sites $23_k$, in order thus to provide a representation (taking the form inter alia of a histogram or a radar chart) forming the signature of the target compounds.

Thus, the characterizing method according to this embodiment allows the quality of the characterization of the compounds of interest to be improved by limiting or even eliminating the measurement bias $\Delta S_k^{b,\Delta\phi}$ associated with a non-zero variation in relative humidity $\Delta\phi$ between the phases Pa and Pb. The useful signal $Su_k(t_i \in Pb)$ allowing the compounds of interest to be characterized is, therefore, computed by correcting the measurement signal $S_k(t_i \in Pb)$ associated with the gas sample with a baseline $\tilde{S}_k^{b,\phi2}$ associated with the reference gas and with the relative humidity $\phi2$. This amounts to estimating the baseline $\tilde{S}_k^{b,\phi2}$ that the reference gas would have for the relative humidity $\phi2$, then subtracting this value from the measurement signal $S_k(t_i)$ detected in step 120. The characterization of the compounds of interest is then made more accurate and precise insofar as it relates to the compounds of interest alone and not, or only slightly, to the gas that saw a variation in its relative humidity in the measurement chamber 21.

Steps 151 to 154 may advantageously be carried out. They allow the quality of the characterization of the compounds of interest to be further improved in the case where the electronic nose 1 exhibits sensor drift, i.e., a variation in the measurement signal output by the electronic nose 1 even though the compounds of interest and the operating conditions are the same. This sensor drift may take place between the calibrating phase 10 and the characterizing phase 100.

In step 151, the baseline $\tilde{S}_k^{b,\phi1}$ representative of the measurement signal associated with the reference gas for a relative humidity $\phi1$ is determined. This baseline $\tilde{S}_k^{b,\phi1}$ is computed using the correction function $h_k$ and using the measured value $\phi1$. In other words, $\tilde{S}_k^{b,\phi1} = h_k(\phi1)$.

In step 152, the measurement signal $S_k(t_i)$ associated with the reference gas, i.e., for $t_i$ belonging to the phase Pa, is corrected by subtracting the determined baseline $\tilde{S}_k^{b,\phi1}$. A useful signal $Su_k(t_i \in Pa)$ such that $Su_k(t_i \in Pa) = S_k(t_i) - \tilde{S}_k^{b,\phi1}$ is thus obtained. Due to the sensor drift, the useful signal $Su_k(t_i \in Pa)$ is not substantially zero as it should be.

In step 153, the baseline $Su_k^b$ of the useful signal $Su_k(t_i \in Pa)$ is determined. It is, for example, a question of the average value of this useful signal over a predefined period, before the time tc and, therefore, before the phase Pb.

In step 154, the useful signal $Su_k(ti \in Pb)$ associated with the second gas sample is corrected by subtracting the determined baseline $Su_{kb}$ from it. A corrected useful signal $Su_{ck}(ti \in Pb)$ that is free from this sensor drift is thus obtained.

In step 160, the compounds of interest are characterized using the corrected useful signal $Su_{ck}(ti \in Pb)$. Insofar as this sensor drift is corrected, a characterization of the compounds of interest of improved quality is obtained.

Figure 4A:
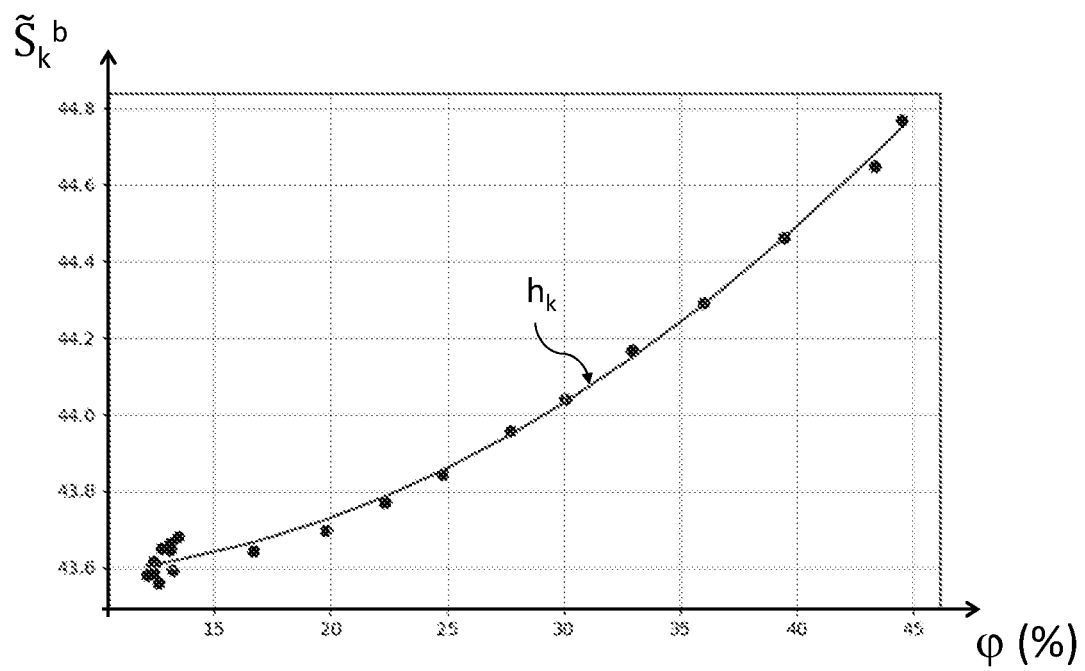
FIG. 4A is an example of a calibration function $h_k$ expressing the change in a baseline $\tilde{S}_k^b$ associated with a reference gas (without the compounds of interest) as a function of relative humidity $\phi$.

The calibrating phase 10 will now be described with reference to FIGS. 4A and 4B, which illustrate an example of variation in the baseline $\tilde{S}_k^b$ associated with a reference gas alone (i.e., containing no target compounds) as a function of the relative humidity $\phi$. In this calibrating phase 10, the tilde sign is used on the letter S to differentiate the measurement signals acquired in this calibrating phase 10 from those acquired in the characterizing phase 100.

In a step 11, the reference gas is injected into the measurement chamber 21. The reference gas is, therefore, formed from the carrier gas alone and does not contain any compounds of interest. It has a non-zero relative humidity $\phi$, which varies over time, preferably in a stepwise fashion.

In a step 12, for each sensitive site $23_k$ ranging from 1 to N, at the current time $t_i$ a measurement signal $\tilde{S}_k(t_i)$ representative here of the reflectivity % $R_k(t_i)$ of the sensitive site $23_k$ in question, and, therefore, also representative of the response of the electronic nose 1 to the presence of the reference gas in the measurement chamber 21, is determined. This step is similar to step 120 and is not, therefore, described again. Insofar as the reference gas does not contain any compounds of interest, the measurement signal $\tilde{S}_k(t_i)$ does not feature the transient assimilation regime Pb.1 and the steady-state equilibrium regime Pb.2. It is therefore possible to determine a baseline $\tilde{S}_k^b$ associated with a given value of the relative humidity $\phi$. It is preferably a question of an average value of $\tilde{S}_k(t_i)$ over a predefined period, in which $\phi$ is preferably constant.

In step 13, the relative humidity $\phi(t_i)$ over time is measured using the humidity sensor 26.

In step 14, the correction function $\tilde{h}_k$ is determined on the basis of the determined baselines $\tilde{S}_k^b$ and of the measured values of relative humidity $\phi$. FIG. 4A illustrates one example of a correction function $h_k$ illustrating the variation in the baseline $\tilde{S}_k^b$ associated with the reference gas (moist air, for example) as a function of relative humidity. In this example, the correction function is a polynomial function that is here parameterized (i.e., the order n of the polynomial and the coefficients are determined) by polynomial regression. Other types of correction functions may be used, such as logarithmic functions, sigmoid neural networks, Gaussian mixtures, etc. Furthermore, other parameterization methods may be used, such as the least squares method. Thus, following the calibrating phase 10, a correction function hit associated with each sensitive site $23_k$ is obtained, the correction function allowing the baseline $\tilde{S}_k^b$ associated with the reference gas (moist air, for example) to be determined for a given relative humidity $\phi$.

Figure 4B:
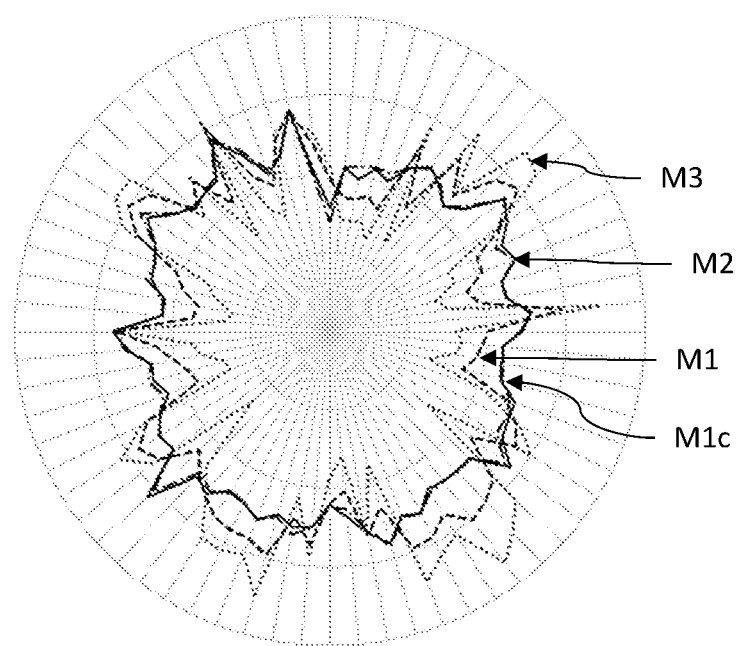
FIG. 4B illustrates the three interaction patterns (signatures) already illustrated in FIG. 2A, and an interaction pattern obtained using the characterizing method according to the first embodiment.

FIG. 4B illustrates the three signatures M1, M2 and M3 shown in FIG. 2A. The signature M1c corresponds to the same second gas sample as the signature M1, i.e., to a gas sample formed from moist air with a relative humidity $\phi2$ equal to about 50% (there is, therefore, a variation in relative humidity $\Delta\phi$) and in which the compounds of interest are butanol molecules. While the signature M1 was obtained using a characterizing method according to one example of the prior art, the signature M1c was obtained using the characterizing method illustrated in FIG. 3. It will be noted that the signature M1c is superposed on the signature M2, which corresponds to an absence of variation in relative humidity $\Delta\phi$ between the phases Pa and Pb. Thus, the characterizing method according to this embodiment actually allows the measurement bias $\Delta S_k^{b,\Delta\phi}$ associated with a non-zero difference $\Delta\phi$ in relative humidity between the phases Pa and Pb to be reduced or even eliminated.

Figure 5:
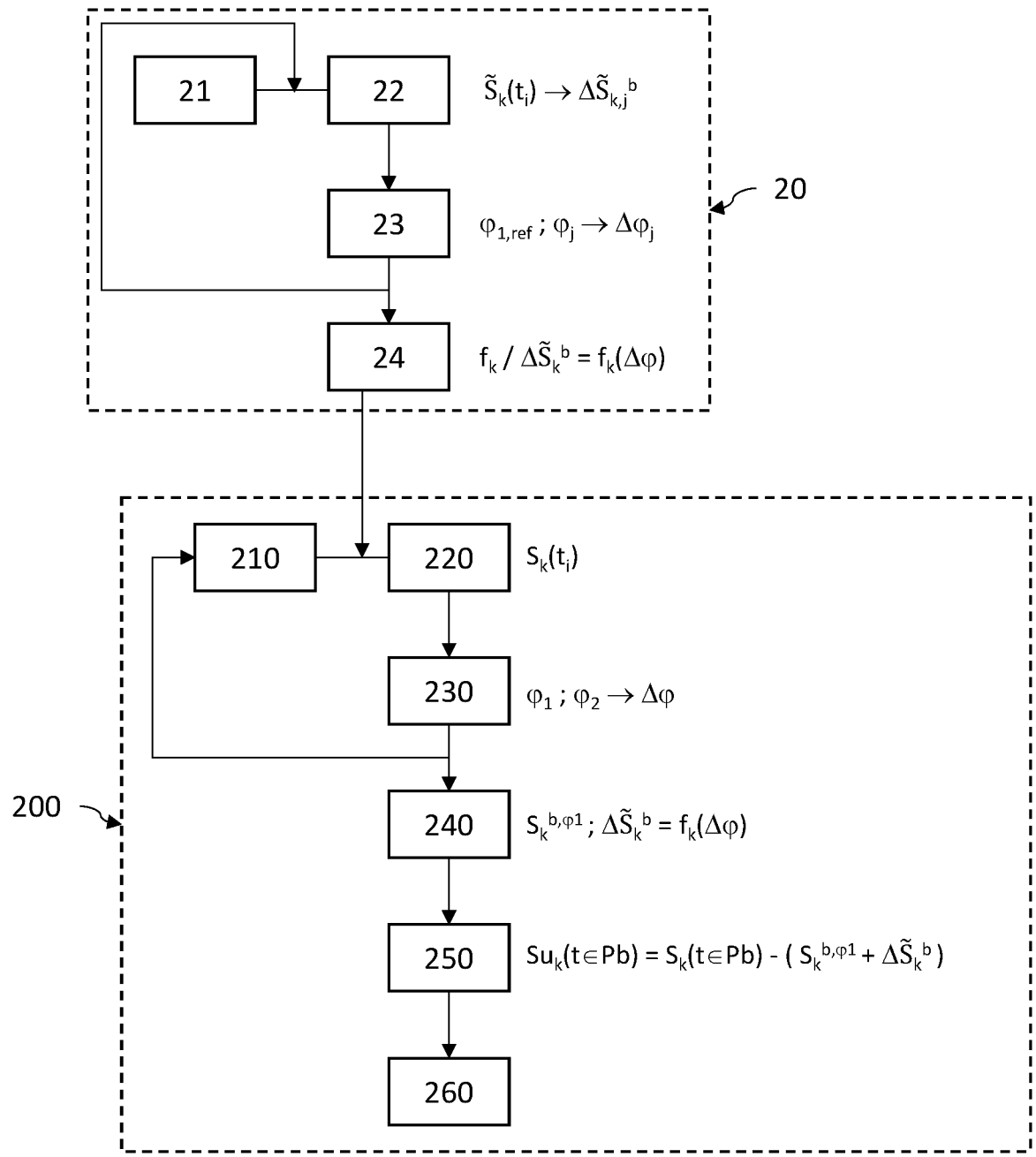
FIG. 5 is a flowchart of a characterizing method according to a second embodiment.

FIG. 5 illustrates a flowchart of a method for characterizing compounds of interest according to a second embodiment, in which the measurement bias $\Delta S_k^{b,\Delta\phi}$ associated with a non-zero relative-humidity difference $\Delta\phi$ between the phases Pa and Pb is reduced or even eliminated, the relative-humidity difference $\Delta\phi$ in the measurement chamber 21 being defined between a value of $\phi1$ in the initial phase Pa, and a value $\phi2$ different from $\phi1$ in the characterizing phase Pb. This method differs from that illustrated in FIG. 3 essentially in that the useful signal is notably corrected using an estimate of the baseline difference $\Delta\tilde{S}_k^{b,\Delta\phi}$ obtained using a correction function $f_k$.

Figure 6A:
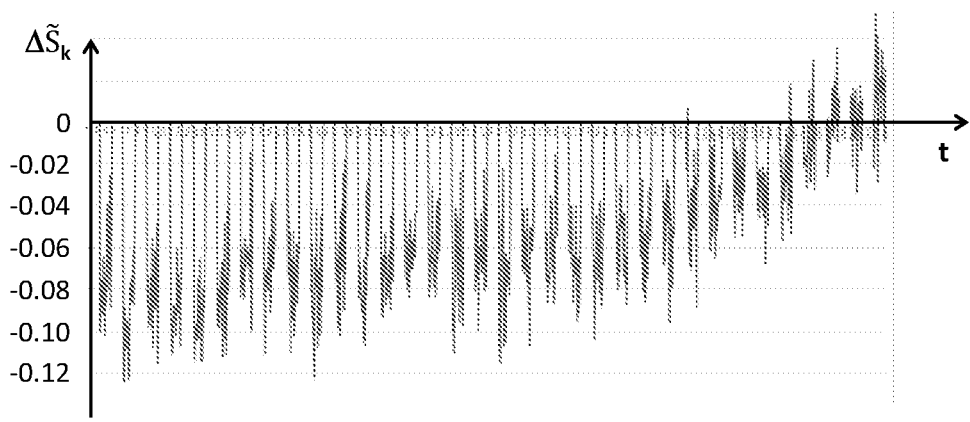
FIG. 6A is an example of a difference $\Delta\tilde{S}_k(t)$ between measurement signals $S_k(t)$ for various injection cycles of various reference gases (without the compounds of interest), each cycle comprising an injection of the first reference gas, the relative humidity $\phi_{1,ref}$ of which remains constant in the course of the cycles, followed by an injection of at least a second reference gas, the relative humidity $\phi_{j=2,3}$ . . . of which varies in the course of the cycles.
Figure 6B:
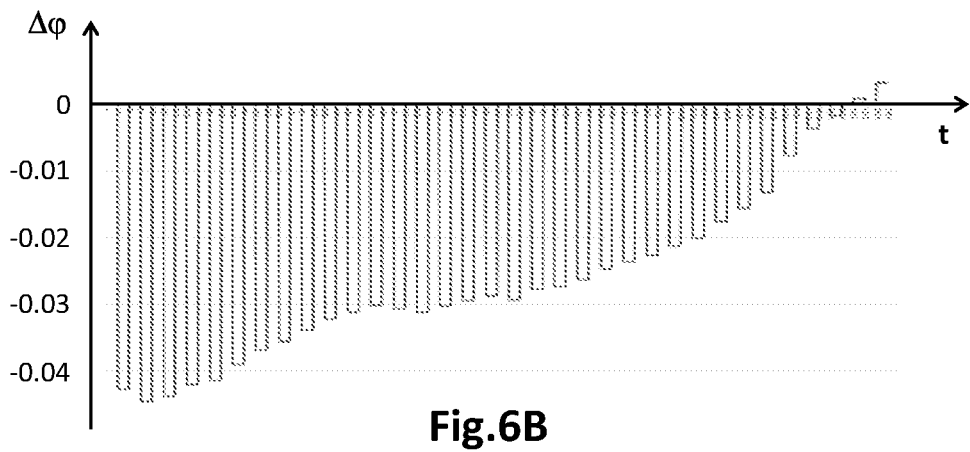
FIG. 6B illustrates the relative-humidity difference $\Delta\phi_j$ in the course of the cycles illustrated in FIG. 6A.
Figure 6C:
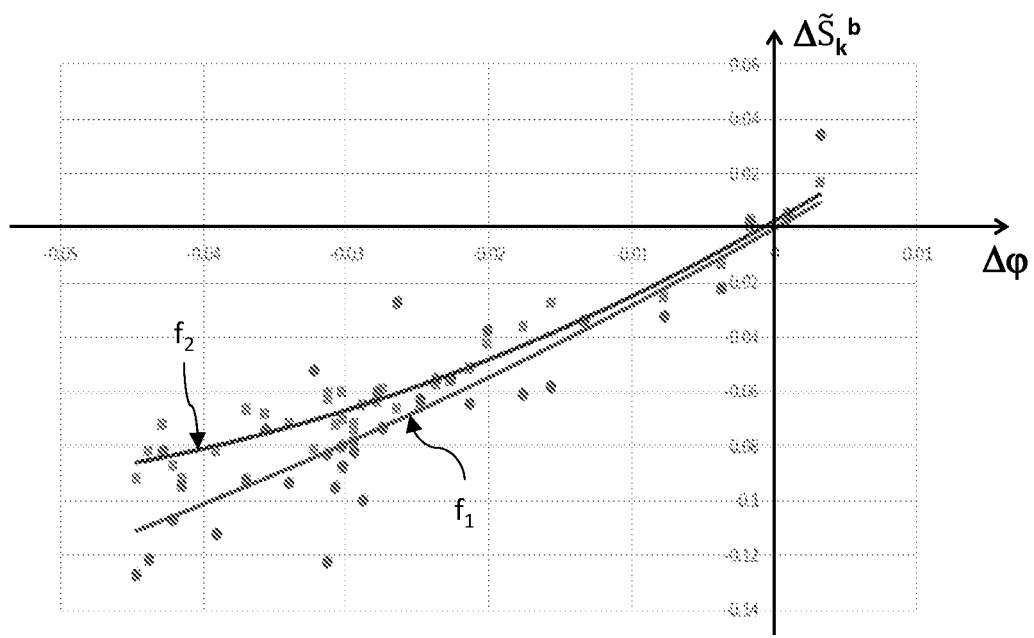
FIG. 6C is an example of a calibration function $f_k$ expressing the change in the difference in baseline $\Delta\tilde{S}_k^b$ as a function of the relative-humidity difference $\Delta\phi$.

In a calibrating phase 20, the correction function $f_k$ is determined. This phase is illustrated in FIGS. 6A to 6C. The objective is to determine a correction function $f_k$ expressing the variation in the difference in baseline $\Delta \tilde{S}_k^b$ as a function of a relative-humidity difference $\Delta \phi$.

In a step 21, a plurality of cycles of injection into the measurement chamber are carried out. Each cycle of rank j is formed from a first injection of a first reference gas of constant and non-zero relative humidity $\phi_{1,ref}$ followed by a second injection of a second reference gas of rank j of constant relative humidity $\phi_j$ different from $\phi_{1,ref}$. In the course of the various cycles, the relative humidity $\phi_j$ varies, so that a plurality of values of the relative-humidity difference $\Delta\phi_j = \phi_j - \phi_{1,ref}$ are obtained.

In a step 22, the measurement signal $\tilde{S}_k(t)$ is acquired. FIG. 6A more precisely illustrates the difference $\Delta \tilde{S}_k(t)$ between the measurement signals associated with the two injections for various successive cycles and a sensitive site $23_k$ as a function of time. More precisely, in this example, the measurement signal of the first injection is subtracted from the measurement signal of the second injection of the same cycle. Thus, as shown in FIG. 6A, the difference $\Delta \tilde{S}_k(t)$ has a zero value during each first injection and a non-zero value during the second injections.

The difference $\Delta \tilde{S}_k^b$ between the baselines of the first and second injections of each cycle are then determined. This means determining the baseline $\tilde{S}_k^b$ for the first and second injections of each cycle and determining the difference therebetween. The baseline $\tilde{S}_k^b$ is preferably an average value of the measurement signal $\tilde{S}_k(t_i)$ over a predefined period.

In a step 23, the relative-humidity difference $\Delta\phi$ between the first and second injections of each cycle is measured. FIG. 6B illustrates the variation in the relative-humidity difference $\Delta\phi$ as a function of time. It will be noted that the difference $\Delta\phi$ is zero for each first injection, and that it is non-zero and varies over time from one second injection to the next. A series of pairs of values $(\Delta\phi_j; \Delta \tilde{S}_{k,j}^b)_{j=1,M}$ is thus obtained, M being the number of cycles performed.

In a step 24, the correction function $f_k$ is determined on the basis of the values determined for the difference in baseline $\Delta \tilde{S}_{k,j}^b$ and of the measured values of the relative-humidity difference $\Delta\phi_j$. FIG. 6C illustrates one example of two calibration functions $f_1$, $f_2$ illustrating the variation in the difference in baseline $\Delta \tilde{S}_{k=1,2}^b$ associated with the reference gas (moist air, for example) as a function of the relative-humidity difference $\Delta\phi$, for two sensitive sites $23_1$ and $23_2$. In this example, the correction function is a polynomial function that is here parameterized (i.e., the order n of the polynomial and the coefficients are determined) by polynomial regression. Other types of calibration functions may be used, such as logarithmic functions, sigmoid neural networks, Gaussian mixtures, etc., just as in the example of FIG. 3. Thus, following the calibrating phase 20, a correction function $f_k$ associated with each sensitive site $6_k$ is obtained, which correction function allows the difference in baseline $\Delta \tilde{S}_k^b$ associated with the reference gas to be determined for a given relative-humidity difference $\Delta\phi$.

Next, the characterizing phase 200 is carried out. In a step 210, the step of injecting fluid into the measurement chamber 21 of the electronic nose 1 is performed. This step comprises a first, initial phase Pa of injecting the reference gas (carrier gas without the compounds of interest), a second, characterizing phase Pb in the course of which the gas sample is injected (carrier gas with the compounds of interest), and then a third, dissociating phase Pc. The reference gas and the gas sample have different relative humidities, denoted $\phi 1$ for the reference gas and $\phi 2$ for the gas sample.

In a step 220, for each sensitive site $23_k$ ranging from 1 to N, at the current time $t_i$, a measurement signal $S_k(t_i)$ representative of the response of the electronic nose 1 to the presence of the reference gas then the gas sample in the measurement chamber 21 is determined. This step is similar to step 120 and is not described in detail again.

In a step 230, the relative humidity in the measurement chamber 21 in the phases Pa and Pb is measured. To this end, the humidity sensor 26 measures the relative humidity $\phi$ in the phases Pa and Pb and transmits the measured values to the processing unit 30.

The relative humidity $\phi 2$ (phase Pb) is here different from the value $\phi 1$ (phase Pa). The processing unit 30 then determines the relative-humidity difference $\Delta\phi = \phi 2 - \phi 1$.

In a step 240, the estimate of the difference in baseline $\Delta \tilde{S}_k^b$ is determined on the basis of the measured relative-humidity difference $\Delta\phi$. As illustrated in FIG. 2B, this difference in baseline $\Delta \tilde{S}_k^b$ corresponds to the impact that the relative-humidity difference $\Delta\phi$ between the phases Pa and Pb has on the measurement signal associated with the gas sample. This difference in baseline $\Delta \tilde{S}_k^b$ is estimated using the correction function $f_k$ and using the measured difference $\Delta\phi$.

Next, the baseline $S_k^{b,\phi 1}$ associated with the reference gas is also determined on the basis of the measurement signal $S_k(t_i \in Pa)$. It is preferably a question of an average value of the measurement signal $S_k(t_i \in Pa)$ in the phase Pa over a predefined period.

In a step 250, the measurement signal $S_k(t_i)$ associated with the gas sample, i.e., for $t_i$ belonging to the phase Pb, is corrected by subtracting the estimate of the difference in baseline $\Delta \tilde{S}_k^b$ for the measured relative-humidity difference $\Delta\phi$, and by subtracting baseline $S_k^{b,\phi 1}$ associated with the reference gas in the phase Pa. A useful signal $Su_k(t_i \in Pb)$ is thus obtained. In other words, $Su_k(t_i \in Pb) = S_k(t_i \in Pb) - [\Delta \tilde{S}_k^b S_k^{b,\phi 1}]$.

Thus, in the context of this embodiment, the useful signal associated with the gas sample, i.e., that comprising the compounds of interest but having undergone a non-zero variation in relative humidity $\Delta\phi$, is computed by correcting its measurement signal $S_k(t_i \in Pb)$ by subtracting therefrom on the one hand the impact $\Delta \tilde{S}_k^b$ of the relative-humidity difference $\Delta\phi$ and on the other hand the baseline $S_k^{b,\phi 1}$. Thus, this embodiment allows the measurement bias $\Delta S_k^{b,\Delta\phi}$ associated with the relative-humidity difference $\Delta\phi$ to be eliminated, and also any sensor drift to be eliminated.

In a step 260, the compounds of interest are characterized on the basis of the useful signals $Su_k(t_i \in Pb)$. An equilibrium, i.e., steady-state, value is extracted from these signals in order to provide a representation in the form of a histogram, a radar chart, etc., forming the signature of the target compounds.

Thus, the characterizing method according to this embodiment also makes it possible to improve the quality of the characterization of the compounds of interest not only by limiting or even eliminating the measurement bias $\Delta S_k^{b,\Delta\phi}$) associated with a non-zero relative-humidity difference $\Delta\phi$ between the phases Pa and Pb, but also by limiting or even eliminating any sensor drift between the calibrating phase 20 and the characterizing phase 200. The characterization of the compounds of interest is then made more accurate and precise insofar as it relates to just the compounds of interest and not, or only slightly, to the carrier gas that has experienced a variation in its relative humidity.

However, the electronic nose 1 may also be subject to another type of sensor drift, in the sense that the predetermined correction function $f_k$ or $h_k$ stored in the memory 31 of the processing unit 30 may no longer be completely representative of the response of the measuring device 20 associated with the gas present in the measurement chamber 21. Thus, it is recommended to recalibrate the electronic nose 1. Here, the electronic nose 1 is able to determine a new correction function $f_k$ or $h_k$, i.e., to re-parameterize this correction function, here without requiring a return to the workshop or a new characterization with the electronic nose associated with the system of FIG. 2C. This recalibrating phase 300, 400 is a so-called on-line recalibrating phase, and may, therefore, be carried out between two characterizing phases 100, 200.

Figure 7A:
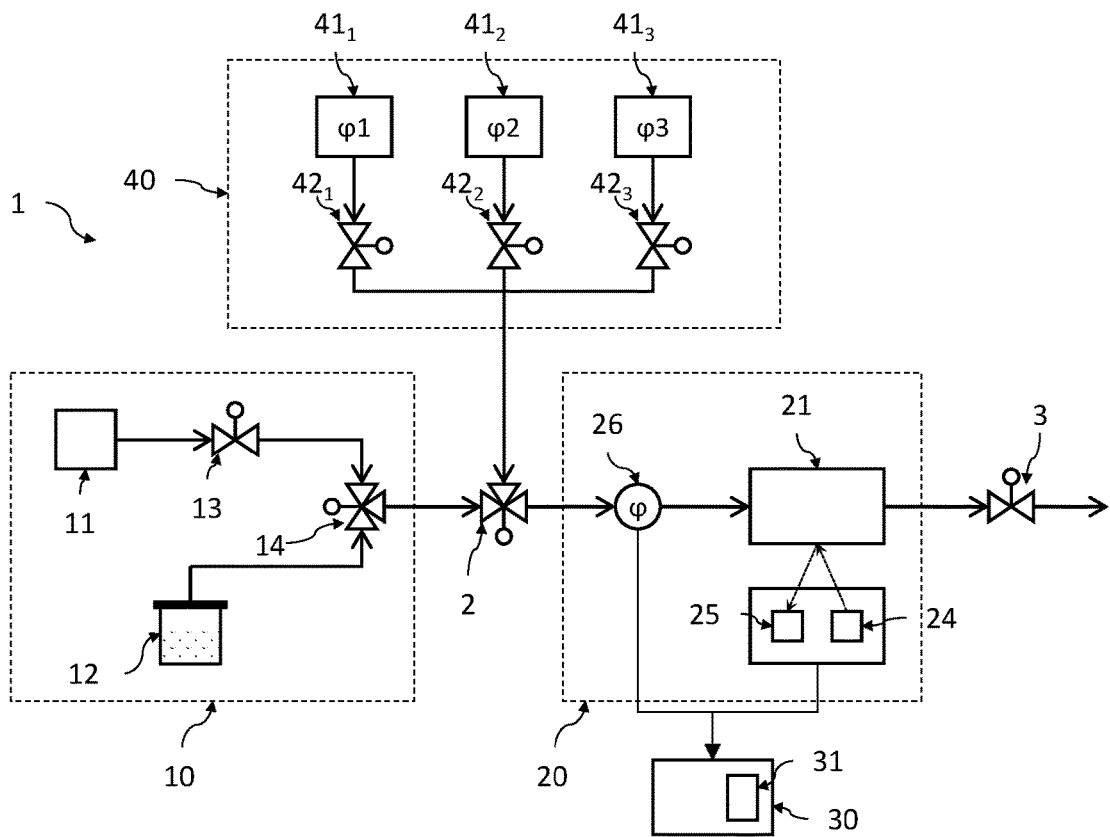
FIG. 7A is a schematic and partial view of an electronic nose according to one embodiment in which the nose is configured to perform a recalibrating phase.

FIG. 7A is a schematic and partial view of an electronic nose 1 according to one embodiment in which it is configured to perform a recalibrating phase 300. Here, the electronic nose 1 is similar to that illustrated in FIG. 2C, and differs therefrom notably in that it comprises a fluidic recalibrating device 40, and in that the processing unit 30 is configured to carry out a recalibrating phase 40.

The electronic nose 1 preferably comprises a three-way valve 2 that allows the measurement chamber 21 to be connected on the one hand to the fluidic supplying device 10 for supplying target compounds, and on the other hand to the fluidic recalibrating device 40, which delivers one or more reference gases having various relative-humidity values over time.

In this example, the fluidic recalibrating device 40 comprises at least three sources 41 (here $41_1$, $41_2$, $41_3$) of reference gases with different relative humidities $\phi 1$, $\phi 2$ and $\phi 3$. Preferably these three relative-humidity values may differ by at most of the order of 20% or more, and may differ with respect to each other by at least 5%. As above, the reference gases are devoid of target compounds. Of course, generally, the supplying device may comprise a higher number of sources 41. Each source 41 is here associated with one valve 42.

Figure 7B:
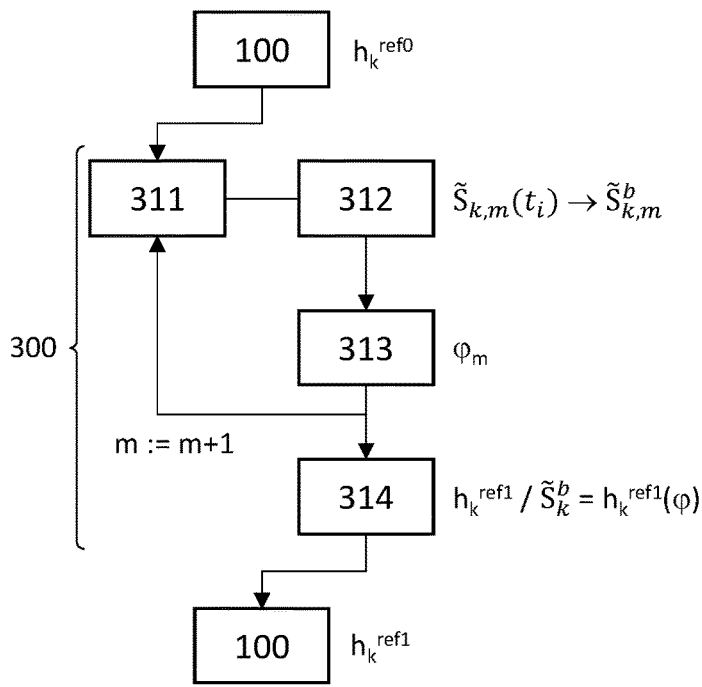
FIG. 7B is a flowchart of a method of use of the electronic nose illustrated in FIG. 7A, implementing a recalibrating phase.

FIG. 7B is an example of a method of use of the electronic nose, comprising a recalibrating phase 300 that is based on a principle similar to that described with reference to the calibrating phase 10 illustrated in FIG. 3.

It comprises at least one phase 100 of characterizing target compounds. This phase is identical to the one described with reference to FIG. 3. Here, the characterizing phase 100 comprises steps 140, 150 of correcting the useful signal Silk on the basis of a corrective parameter, here a baseline $\tilde{S}_k^{b,\phi 2}=h_k(\phi 2)$ representative of the measurement signal associated with the reference gas for a relative humidity $\phi 2$. This corrective parameter is determined using a correction function, here denoted $h_k^{ref0}$, determined in the calibrating phase 10. This calibrating phase 10 may have been carried out in the workshop, before the electronic nose 1 was actually commissioned.

It is now desired to recalibrate the electronic nose, i.e., here to redetermine the correction function, this new correction then being denoted $h_k^{ref1}$, perhaps because sensor drift has been identified. This involves updating; the various coefficients that parameterize the correction function.

To do this, the recalibrating phase 300 comprises a step 311 of injection of a first reference gas into the measurement chamber, here the reference gas drawn from the source $41_1$ and having a relative humidity $\phi 1$. Thus, valve 2 is made to block flow from the fluidic supplying device 10, and to permit flow from the fluidic recalibrating device 40. Valve $42_1$, which is connected to the output of the source $41_1$, is opened while valves $42_2$ and $42_3$ are kept closed.

In step 312, the measuring device 20 acquires the measurement signal $\tilde{S}_{k,m=1}(t)$ in the course of the injection step 311, then the processing unit 30 determines the associated baseline $\tilde{S}_{k,1}^b$, which is stored in the memory 31.

In step 313, in the course of the injection step 311, the relative humidity $\phi_1$ is measured over time using the humidity sensor 26. This step is optional if the relative-humidity value of the reference gas present in the source $41_1$ (which is otherwise referred to herein as a reservoir $41_1$) may be considered to be known already, and if the relative-humidity value in the measurement chamber 21 may be considered to be equal to the known relative-humidity value in the reservoir $41_1$. This relative-humidity value $\phi 1$ is stored in the memory 31 of the processing unit 30.

Steps 311, 312 and 313 are reiterated for the various reference gases stored in the sources 41 (which are otherwise referred to herein as "reservoirs" 41) with m=1-3 (i.e., incremented from 1 to 3). Thus, the memory here comprises three pairs of values $(\phi_m; \tilde{S}_{k,m}^b)_{m=1-3}$.

In step 314, the processing unit 30 determines the new correction function $h_k^{ref1}$, for example by regression, least squares, inter alia, on the basis of the pairs of values $(\phi_m; \tilde{S}_{k,m}^b)_{m=1-3}$. The new correction function $h_k^{ref1}$ is stored in the memory, and replaces the old function $h_k^{ref0}$.

Thus, the electronic nose 1 is able to carry out a recalibrating phase 300, and thus allows the problem of sensor drift associated with the correction function to be solved. Moreover, the fact that recalibration is carried out on-line allows the reliability of the electronic nose 1 over long periods of time to be improved, and avoids the need to return the electronic nose to the workshop for recalibration.

The method of use may thus comprise at least one following phase 100 of characterizing target compounds, this phase being carried out following the recalibrating phase 300. This phase 100 is identical to the one described with reference to FIG. 3 or may be identical to the one described with reference to FIG. 5. Here, the following characterizing phase 100 comprises steps 140, 150 of correcting the useful signal $Su_k$ on the basis of a corrective parameter. This corrective parameter is determined using the updated correction function, which here is denoted $h_k^{ref1}$, determined in the recalibrating phase 300, and no longer using the old correction function $h_k^{ref0}$.

Moreover, the sources 41 may be reservoirs prefilled with reference gases of various relative humidities, or, as a variant, may be filled by the electronic nose 1 itself. Thus, the reservoirs 41 may be connected to the exterior environment by means of a fluidic duct connected to a relative-humidity sensor (not shown). The reservoirs 41 are initially empty, and are filled one after the other using moist exterior air as the relative humidity of this moist air varies. Thus, over the course of a day, or over the course of a season, the relative humidity of the exterior air varies, for example ranging from 15% to 50% (e.g., in winter and summer), or ranging from 30% to 70% (e.g., in spring and autumn). Thus, the electronic nose 1 regularly measures the relative humidity of the exterior air using the relative-humidity sensor, and when the moist air has a predefined value $\phi_m$, the electronic nose fills the reservoir $41_m$ until the various reservoirs 41 have been filled with moist air of various relative humidities $\phi_m$.

Figure 7C:
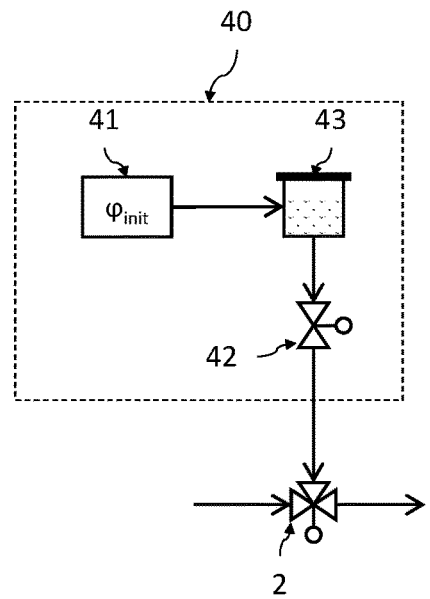
FIG. 7C is a schematic view of one portion of an electronic nose according to one variant embodiment.

FIG. 7C is a schematic view of one portion of an electronic nose 1 according to one variant embodiment, which differs from the one illustrated in FIG. 7A essentially in the fluidic recalibrating device 40.

In this example, the fluidic recalibrating device 40 is configured to supply the measurement chamber 21 with a reference gas from a single reservoir 41, which is associated with a reservoir 43 of a hydrophilic solution, and not from a plurality of separate reservoirs. Once again, the reference gas does not contain any target compounds.

The reservoir 41 contains a reference gas having a non-zero relative humidity $\phi_{init}$. It is connected to the headspace of the reservoir 43, which contains a hydrophilic liquid solution, for example a nitric acid ester. The headspace is then connected to the valve 2, here by a valve 42.

Thus, in the recalibrating phase 300, the reference gas passes through the reservoir 43 of the hydrophilic solution, then is introduced into the measurement chamber 21. Initially, it has, in the measurement chamber 21, the relative humidity omit, then, as the hydrophilic solution adsorbs water molecules, the relative humidity of the reference gas decreases, and thus passes to an intermediate value $\phi_{int}$ lower than $\phi_{init}$ (moisture depletion) before subsequently reaching a final value $\phi_f$ when thermodynamic equilibrium is reached in the headspace of the reservoir 43. Thus, in step 314, the processing unit 30 will have obtained at least three pairs of values $(\phi_m; \tilde{S}_{k,m}^b)_{m=1-3}$ allowing it to determine the new correction function $h_k^{ref1}$.

Here, the reservoir 41 of the reference gas of relative humidity $\phi_{init}$ may have been filled in the workshop, or as a variant may have been filled by the electronic nose 1 with moist air from the exterior environment. To do this, as described above, the reservoir 41 is connected to the exterior environment by means of a fluidic duct equipped with a relative-humidity sensor (not shown). When the exterior air has a relative humidity substantially equal to $\phi_{init}$, the electronic nose 1 fills the reservoir 41.

Figure 8A:
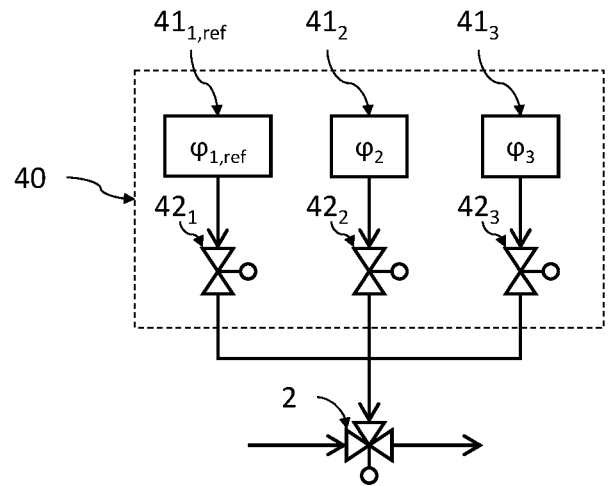
FIG. 8A is a schematic and partial view of an electronic nose according to another embodiment in which the nose is configured to perform a recalibrating phase.

FIG. 8A is a schematic and partial view of an electronic nose 1 according to another embodiment in which it is configured to perform a recalibrating phase 400. Here, the electronic nose 1 is similar to that illustrated in FIG. 7A, and notably differs therefrom in the fluidic recalibrating device 40.

In this example, the fluidic recalibrating device 40 comprises three sources 41 of reference gas, a source $41_{1,ref}$ of a reference gas with a relative humidity $\phi_{1,ref}$, and sources $41_2$ and $41_3$ with relative humidities $\phi_2$ and $\phi_3$. Preferably, these values $\phi_2$ and $\phi_3$ differ from $\phi_{1,ref}$ and from each other, preferably by at least 5%. Of course, the fluidic recalibrating device 40 may comprise a higher number of reservoirs. As above, the reference gases are devoid of target compounds.

Figure 8B:
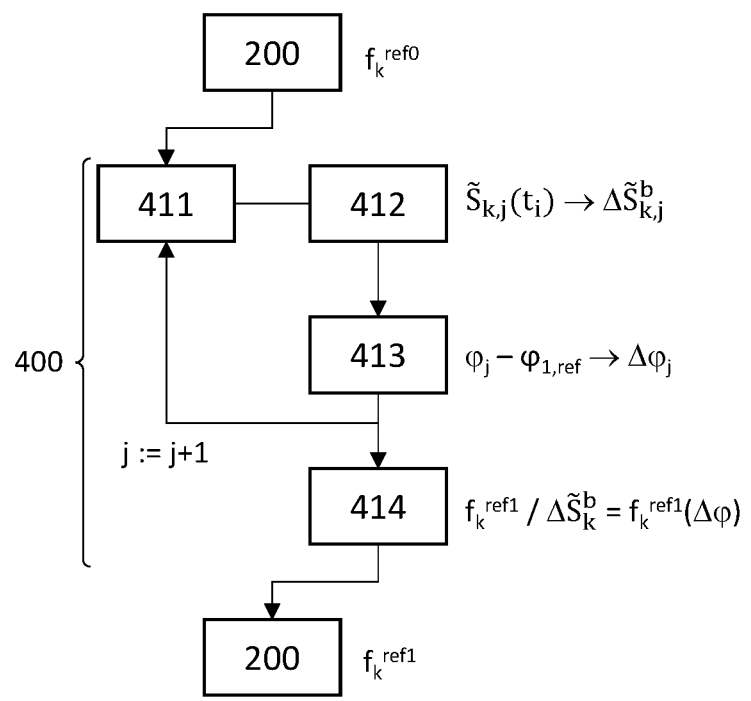
FIG. 8B is a flowchart of a method of use of the electronic nose illustrated in FIG. 8A, implementing a recalibrating phase.

FIG. 8B is an example of a method of use of the electronic nose, comprising a recalibrating phase 400 that is based on a principle similar to that described with reference to the calibrating phase 20 illustrated in FIG. 5.

It comprises at least one phase 200 of characterizing target compounds. This phase is identical to the one described with reference to FIG. 5. Here, the characterizing phase 200 comprises a step 240, 250 of correcting the useful signal $Su_k$ on the basis of a corrective parameter $\Delta\tilde{S}_k^b$. This corrective parameter is determined using the correction function, here denoted $f_k^{ref0}$, determined in the calibrating phase 20. This calibrating phase 20 may have been carried out in the workshop, before the electronic nose 1 was actually commissioned.

It is now desired to recalibrate the electronic nose, i.e., here to redetermine the correction function, this new correction then being denoted $f_k^{ref1}$, perhaps because sensor drift has been identified. The objective is to determine the new correction function $f_k$ expressing the variation in the difference in baseline $\Delta\tilde{S}_k^b$ as a function of a relative-humidity difference $\Delta\phi$. This involves updating the various coefficients that parameterize the correction function.

In a step 411, a plurality of cycles of injection of reference gas into the measurement chamber 21 are carried out. The reference gases do not contain any compounds of interest. Each cycle is associated with one relative-humidity difference value $\Delta\phi_j = \phi_j - \phi_{1,ref}$. To this end, each injection cycle is formed from a first injection of the first reference gas of relative humidity $\phi_{1,ref}$, followed by a second injection of a second reference gas of relative humidity $\phi_j$, with j=2,3 . . . , different from $\phi_{1,ref}$.

In the course of the various cycles, the relative humidity $\phi_j$ varies, so that, in step 413, a plurality of values of the relative-humidity difference $\Delta\phi_j = \phi_j - \phi_{ref}$ are obtained. These values are transmitted to the processing unit 30 and stored in the memory 31.

In step 412, the measurement signal $\tilde{S}_k(t)$ in the various injection cycles is acquired. Thus, in the cycle j=2, the measurement signal $\tilde{S}_k(t)$ associated with the reference gas of $\phi_{1,ref}$ is acquired, then the measurement signal $\tilde{S}_k(t)$ associated with the reference gas of $\phi_2$ is acquired. The processing unit then determines the baseline $\tilde{S}_{k,1}^b$ associated with the reference gas of $\phi_{1,ref}$, then determines the baseline $\tilde{S}_{k,2}^b$ associated with the reference gas of $\phi_2$. It then determines the difference $\Delta\tilde{S}_{k,2}^b$ between these baselines. The relative-humidity difference is then $\Delta\phi_2$.

Steps 411, 412 and 413 are reiterated for the various reference gases with here j=2,3 (2 cycles). Thus, the memory here comprises two pairs of values $(\Delta\phi_j; \Delta\tilde{S}_{k,j}^b)_{j=1,2}$.

In step 414, the processing unit determines the new correction function $f_k^{ref1}$, for example by regression, least squares, inter alia, on the basis of the pairs of values $(\Delta\phi_j; \Delta\tilde{S}_{k,j}^b)_{j=1,2}$. The new correction function $f_k^{ref1}$ is stored in the memory 31, and replaces the old function $f_k^{ref0}$.

Thus, the electronic nose 1 is able to carry out a recalibrating phase 400, and thus allows the problem of sensor drift associated with the correction function to be solved. In addition, the fact that recalibration is carried out on-line allows the reliability of the electronic nose over long periods of time to be improved, and avoids the need to return the electronic nose to the workshop for recalibration. The method of use may then comprise a new characterizing phase 200, which will use the new correction function $f_k^{ref1}$.

Particular embodiments have just been described. Various modifications and variants will be obvious to anyone skilled in the art.

The invention claimed is:

1. A method for recalibrating an electronic nose suitable for characterizing target compounds present in a gas sample introduced into a measurement chamber, the measurement chamber comprising at least one sensitive site having receptors with which the target compounds are able to interact via adsorption/desorption, the electronic nose comprising a processing unit in which is pre-stored a first correction function expressing a variation in a parameter representative of a measurement signal associated with a reference gas as a function of a relative humidity, the method comprising:

successively injecting, into the measurement chamber, reference gases not containing target compounds, the reference gases injected one after the other and having various predetermined non-zero values of relative humidity, wherein successively injecting the reference gases comprises an injection of a given reference gas, the given reference gas being drawn from a reservoir in which the given reference gas has an initial relative-humidity value and passing, before the given reference gas reaches the measurement chamber, through a reservoir partially filled with a hydrophilic liquid, so that the given reference gas introduced into the measurement chamber has a relative humidity that decreases from the initial relative-humidity value to a final value through an intermediate value;

determining, in the course of each injection, a measurement signal representative of the interactions of the receptors with the reference gas present, at various measurement times, in response to an excitation signal transmitted to the sensitive site, then determining, for each reference gas, a baseline representative of the determined measurement signal, the baseline being associated with the relative humidity of the reference gas present; and determining a second correction function expressing a variation in a parameter representative of the measurement signal associated with the reference gas as a function of relative humidity, on the basis of the determined baselines and of the predetermined values of relative humidity, the second correction function then being stored in the processing unit instead of the first correction function.

2. The method of claim 1, wherein the baseline is an average of at least one portion of the corresponding measurement signal; and the parameter representative of the measurement signal is equal to the baseline.

3. The method of claim 1, wherein successively injecting the reference gases comprises at least three injections of various reference gases one after the other, from various reservoirs, the at least three injections of various reference gases comprising the injection of the given reference gas.

4. A method for recalibrating an electronic nose suitable for characterizing target compounds present in a gas sample introduced into a measurement chamber, the measurement chamber comprising at least one sensitive site having receptors with which the target compounds are able to interact via adsorption/desorption, the electronic nose comprising a processing unit in which is pre-stored a first correction function expressing a variation in a parameter representative of a measurement signal associated with a reference gas as a function of a relative humidity, the method comprising:

successively injecting, into the measurement chamber, reference gases not containing target compounds, the reference gases injected one after the other and having various predetermined non-zero values of relative humidity, wherein successively injecting the reference gases comprises a plurality of injection cycles, each cycle being formed from an injection of a first reference gas having a first relative humidity and of an injection of various second reference gases having various second relative humidities, so as to obtain a plurality of relative-humidity differences between each second relative humidity and the first relative humidity, the relative-humidity differences being different from one another;

determining, in the course of each injection, a measurement signal representative of the interactions of the receptors with the reference gas present, at various measurement times, in response to an excitation signal transmitted to the sensitive site, then determining, for each reference gas, a baseline representative of the determined measurement signal, the baseline being associated with the relative humidity of the reference gas present; and determining a second correction function expressing a variation in a parameter representative of the measurement signal associated with the reference gas as a function of relative humidity, on the basis of the determined baselines and of the predetermined values of relative humidity, the second correction function then being stored in the processing unit instead of the first correction function.

5. The method of claim 4, wherein the electronic nose comprises a first source of the first reference gas having a first relative humidity, and various second sources of second reference gases having the various second relative humidities.

6. The method of claim 4, wherein the parameter representative of the measurement signal is equal to a reference difference between baselines associated with the first reference gas and with each second reference gas, each reference difference being different from the others.

7. A method of using an electronic nose for characterizing target compounds, wherein:

the electronic nose comprises:
a measuring device comprising:
a measurement chamber suitable for receiving a gas sample containing compounds of interest to be characterized, and comprising at least one sensitive site having receptors with which the target compounds are able to interact via adsorption/desorption;
a measuring unit suitable for determining a measurement signal representative of the interactions of the receptors with at least the gas present, at various measurement times, in response to an excitation signal transmitted to the sensitive site;
a humidity sensor suitable for measuring relative-humidity values of the gas present in the measurement chamber;
a fluidic supplying device comprising:
a source of a reference gas, the source of the reference gas being connected to the measurement chamber;
a source of target compounds, the source of the target compounds being connected to the measurement chamber, the gas sample being formed from a gas and from the target compounds;
a fluidic recalibrating device comprising at least one source of at least one reference gas, the at least one source of the at least one reference gas being suitable for supplying the measurement chamber with reference gases having various relative-humidity values; and
a processing unit suitable for:
determining a corrective parameter on the basis of:
at least one measured relative-humidity value; and
a predetermined correction function associated with the sensitive site and expressing a variation in a parameter representative of the measurement signal associated with a reference gas as a function of the at least one measured relative-humidity value;
determining a useful signal via correction of the measurement signal associated with the gas sample on the basis of at least the determined corrective parameter;
characterizing the target compounds on the basis of the determined useful signal; and
determining a second correction function, on the basis of the various relative-humidity values of the reference gas present in the measurement chamber, and of the corresponding measurement signals, the method comprising a plurality of phases of characterizing the target compounds, including a first characterizing phase performed before recalibrating the electronic nose, and a second characterizing phase performed after the recalibration, each characterizing phase comprising:

injecting into the measurement chamber:
   during a first phase, the reference gas not containing the target compounds, and
   during a second phase, the gas sample comprising the target compounds;

determining, in the course of the injecting, the measurement signal representative of the interactions of the receptors with at least the gas present, at various measurement times, in response to the excitation signal transmitted to the sensitive site;

measuring the relative-humidity values in the first phase and the second phase in the measurement chamber, respectively, the relative-humidity values being different from one another;

determining the corrective parameter associated with the sensitive site, on the basis of at least the measured relative-humidity value from the second phase and of the predetermined correction function expressing the variation in the parameter representative of the measurement signal associated with the reference gas as the function of the at least one measured relative-humidity value;

determining the useful signal via correction of the measurement signal associated with the gas sample, on the basis of at least the determined corrective parameter; and characterizing the target compounds on the basis of the determined useful signal, the first characterizing phase using a pre-stored first correction function, the recalibration determining the second correction function, and the second characterizing phase using the determined second correction function.

* * * * *